United States Patent
Zhang et al.

(10) Patent No.: US 11,888,419 B2
(45) Date of Patent: Jan. 30, 2024

(54) UNIFIED OPEN-CIRCUIT FAULT-TOLERANT CONTROL METHOD FOR VECTOR CONTROL DRIVE SYSTEM AND DIRECT TORQUE CONTROL DRIVE SYSTEM OF FIVE-PHASE PERMANENT MAGNET FAULT TOLERANT MOTOR

(71) Applicant: JIANGSU UNIVERSITY, Zhenjiang (CN)

(72) Inventors: Li Zhang, Zhenjiang (CN); Xiaoyong Zhu, Zhenjiang (CN); Lei Xu, Zhenjiang (CN); Chao Zhang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/013,568

(22) PCT Filed: Mar. 22, 2021

(86) PCT No.: PCT/CN2021/082038

§ 371 (c)(1),
(2) Date: Dec. 29, 2022

(87) PCT Pub. No.: WO2022/183537

PCT Pub. Date: Sep. 9, 2022

(65) Prior Publication Data

US 2023/0344373 A1 Oct. 26, 2023

(30) Foreign Application Priority Data

Mar. 2, 2021 (CN) .......................... 202110229844.3

(51) Int. Cl.
*H02P 21/00* (2016.01)
*H02P 21/22* (2016.01)
(Continued)

(52) U.S. Cl.
CPC .......... *H02P 21/0017* (2013.01); *H02P 21/05* (2013.01); *H02P 21/10* (2013.01); *H02P 21/22* (2016.02)

(58) Field of Classification Search
CPC combination set(s) only.
See application file for complete search history.

(56) References Cited

U.S. PATENT DOCUMENTS

2016/0028343 A1 1/2016 Choi et al.
2022/0368269 A1* 11/2022 Chen ..................... H02P 29/028

FOREIGN PATENT DOCUMENTS

CN 107276492 A 10/2017
CN 107565868 A 1/2018
(Continued)

OTHER PUBLICATIONS

Ping Zheng, Design and test of torque adjustment system of five-phase fault-tolerant permanent-magnet machine, 2014, IEEE, 1643-1647 (Year: 2014).*

(Continued)

*Primary Examiner* — Bickey Dhakal
(74) *Attorney, Agent, or Firm* — Bayramoglu Law Offices LLC

(57) ABSTRACT

A unified open-circuit fault-tolerant control method for a vector control (VC) drive system and a direct torque control (DTC) drive system of a five-phase permanent magnet fault-tolerant motor are provided. The control method adopts a unified open-circuit fault-tolerant control strategy. The unified open-circuit fault-tolerant control strategy includes: obtaining a predetermined torque, obtaining predetermined direct-axis and quadrature-axis voltages, analyzing a fault-tolerant mechanism to obtain fault-tolerant currents, obtaining winding phase voltages in a fault mode based on the fault-tolerant mechanism, and obtaining fault-tolerant voltages based on a back-electromagnetic force (EMF). The unified open-circuit fault-tolerant control strategy suitable for the VC drive system and the DTC drive system is proposed based on chaotic pulse width modulation (CPWM). The control method essentially reveals the fault-tolerant mechanism, and solves the problem of variable and complicated fault-tolerant control schemes corresponding to various basic control algorithms.

9 Claims, 15 Drawing Sheets

(51) Int. Cl.
H02P 21/05 (2006.01)
H02P 21/10 (2016.01)

(56) References Cited

FOREIGN PATENT DOCUMENTS

| CN | 108306571 A | 7/2018 |
| CN | 108768223 A | 11/2018 |
| CN | 110504889 A | 11/2019 |
| CN | 110518859 A | 11/2019 |

OTHER PUBLICATIONS

Gao Hong-Wei, et al., Fault-tolerant control strategy for five-phase permanent magnet synchronous motor, Electric Machines and Control, 2014, pp. 61-71, vol. 18 No. 6.

Mario Bermudez, et al., Open-Phase Fault-Tolerant Direct Torque Control Technique for Five-Phase Induction Motor Drives, IEEE Transactions on Industrial Electronics, 2017, pp. 902-911, vol. 64, No. 2.

Li Zhang, et al., Fault-Tolerant Direct Torque Control of Five-Phase FTFSCW-IPM Motor Based on Analogous Three-Phase SVPWM for Electric Vehicle Applications, IEEE Transactions on Vehicular Technology, 2018, pp. 910-919, vol. 67, No. 2.

Huawei Zhou, et al., Remedial Field-Oriented Control of Five-Phase Fault-Tolerant Permanent-Magnet Motor by Using Reduced-Order Transformation Matrices, IEEE Transactions on Industrial Electronics, 2017, pp. 169-178, vol. 64, No. 1.

\* cited by examiner

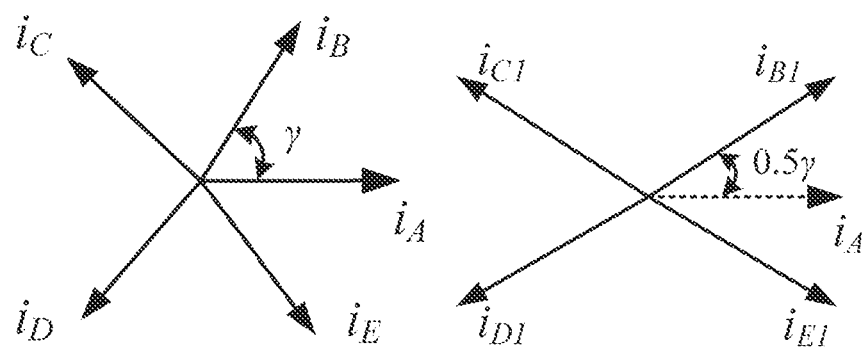
FIG. 3A                                  FIG. 3B
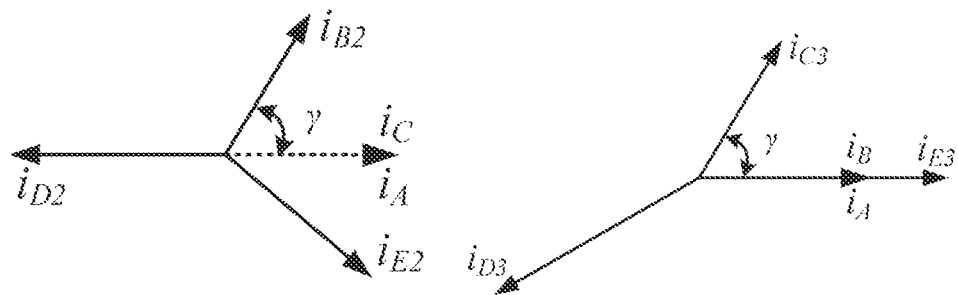
FIG. 3C                                  FIG. 3D

UNIFIED OPEN-CIRCUIT FAULT-TOLERANT CONTROL METHOD FOR VECTOR CONTROL DRIVE SYSTEM AND DIRECT TORQUE CONTROL DRIVE SYSTEM OF FIVE-PHASE PERMANENT MAGNET FAULT TOLERANT MOTOR

CROSS REFERENCE TO THE RELATED APPLICATIONS

This application is the national phase entry of International Application No. PCT/CN2021/082038, filed on Mar. 22, 2021, which is based upon and claims priority to Chinese Patent Application No. 202110229844.3, filed on Mar. 2, 2021, the entire contents of which are incorporated herein by reference.

TECHNICAL FIELD

The present disclosure belongs to the technical field of fault-tolerant control of multi-phase motors, and in particular relates to a unified open-circuit fault-tolerant control method for a vector control (VC) drive system and a direct torque control (DTC) drive system of a five-phase permanent magnet fault-tolerant motor.

BACKGROUND

With the increasingly prominent global environmental problems, electric vehicles have received more and more attention. As manned vehicles, electric vehicles must have high safety and reliability. Multi-phase permanent magnet motors are widely used in electric vehicles, hybrid vehicles and other electric drive fields due to their high efficiency, high power density, wide speed range, low torque ripple and strong fault tolerance. Vector control (VC) and direct torque control (DTC) have attracted much attention due to their high drive performance. However, once a fault occurs, the normal operation of the motor drive systems will be affected, and even safety accidents will occur. Therefore, it is of great practical significance to study the fault-tolerant control of the multi-phase permanent magnet motor drive systems so as to improve their reliability.

At present, domestic and foreign scholars' study focuses on open-circuit fault-tolerant control strategies of multi-phase permanent magnet motors. The document "*Fault-tolerant control strategy for five phase permanent magnet synchronous motors*" (Electric Machines and Control, 2014) proposes a fault-tolerant current control strategy for five-phase permanent magnet motors based on the principle of minimum and equal copper loss. Chinese patent application CN201910669271.9 "Fault-tolerant direct torque control method for five-phase permanent magnet synchronous motor based on fault-tolerant switching table" and the document "*Open phase fault-tolerant direct torque control technique for five phase induction motor drives*" (IEEE Transaction on Industrial Electronics, 2017) propose fault-tolerant direct torque control methods based on a fault-tolerant switching table of a virtual space voltage vector. These methods are proposed based on traditional hysteresis comparison control, and have problems such as unfixed switching frequency, and large torque and flux linkage ripple. In order to overcome the problems caused by hysteresis comparison control, the document "*Fault-tolerant direct torque control of five-phase FTFSCW-IPM motor based on analogous three-phase SVPWM for electric vehicle applications*" (IEEE Transaction on Vehicular Technology, 2017) proposes a fault-tolerant control method based on space vector pulse width modulation (SVPWM) for one-phase open-circuit faults of five-phase permanent magnet motors. This method overcomes the shortcomings of hysteresis control-based fault-tolerant control systems. However, it is based on the reconstruction of a voltage vector after the fault, and it is complex, which is not conducive to engineering applications. For this reason, the document "*Remedial field-oriented control of five-phase fault-tolerant permanent-magnet motor by using reduced-order transformation matrices*" (IEEE Transaction on Industrial Electronics, 2017) and Chinese patent application CN201810025607.3 "One-phase open-circuit fault-tolerant direct thrust control method of five-phase permanent magnet linear motor" propose fault-tolerant methods based on chaotic pulse width modulation (CPWM) for VC and DTC, respectively. These two methods do not need to reconstruct a voltage vector after the fault. However, due to the use of two coordinate transformation matrices, in fact, two independent control algorithms are used under normal operation and fault-tolerant operation of the motors. That is, these two methods do not essentially simplify the control algorithms or minimize the reconfiguration of the control systems in the event of a fault. On the whole, the existing CPWM-based fault-tolerant control methods do not essentially reveal the fault-tolerant mechanisms, and with the emergence of various algorithms in recent years, the corresponding fault-tolerant control schemes are varied and complicated.

SUMMARY

In order to solve the problems existing in the prior art, an objective of the present disclosure is to provide a unified open-circuit fault-tolerant control method for a vector control (VC) drive system and a direct torque control (DTC) drive system of a five-phase permanent magnet fault-tolerant motor. The present disclosure essentially reveals a fault-tolerant mechanism, and improves the robust operation capability of motor drive systems, such that the control systems have desirable open-circuit fault-tolerant operation performance, as well as desirable dynamic and static performance, anti-interference ability and robustness. In addition, the present disclosure is suitable for various control algorithms, and can minimize the reconfiguration of the control systems and save memory resources such as the central processing unit (CPU) of controllers under different failures.

In order to achieve the above objective, the present disclosure adopts the following technical solution: a unified open-circuit fault-tolerant control method for a vector control (VC) drive system and a direct torque control (DTC) drive system of a five-phase permanent magnet fault-tolerant motor. The control method includes the following steps:

step 1) establishing a mathematical model of various currents of the five-phase permanent magnet fault-tolerant motor under normal operation:

expressing currents $i_A$, $i_B$, $i_C$, $i_D$, and $i_E$ of the five-phase permanent magnet fault-tolerant motor under normal operation as follows:

$$\begin{bmatrix} i_A \\ i_B \\ i_C \\ i_D \\ i_E \end{bmatrix} = \begin{bmatrix} \sin\theta & \cos\theta & \sin 3\theta & \cos 3\theta \\ \sin(\theta-\gamma) & \cos(\theta-\gamma) & \sin 3(\theta-\gamma) & \cos 3(\theta-\gamma) \\ \sin(\theta-2\gamma) & \cos(\theta-2\gamma) & \sin 3(\theta-2\gamma) & \cos 3(\theta-2\gamma) \\ \sin(\theta-3\gamma) & \cos(\theta-3\gamma) & \sin 3(\theta-3\gamma) & \cos 3(\theta-3\gamma) \\ \sin(\theta-4\gamma) & \cos(\theta-4\gamma) & \sin 3(\theta-4\gamma) & \cos 3(\theta-4\gamma) \end{bmatrix} \begin{bmatrix} i_{d1}^* \\ i_{q1}^* \\ i_{d3}^* \\ i_{q3}^* \end{bmatrix}$$

where, $\gamma=72°$; $\theta$ is an electrical angle of a rotor position; $i_{d1}{}^*$ and $i_{q1}{}^*$ are direct-axis and quadrature-axis components of a predetermined value of a fundamental current; and $i_{d3}{}^*$ and $i_{q3}{}^*$ are direct-axis and quadrature-axis components of a predetermined value of a third harmonic current;

step 2) obtaining fault-tolerant currents under an open circuit of a single phase, open circuits of two non-adjacent phases and open circuits of two adjacent phases, and analyzing a fault-tolerant mechanism;

step 3) constructing a torque controller based on a difference between a predetermined speed and a detected speed to obtain a predetermined torque $T_e^*$ so as to suppress a torque ripple of the motor after a fault, where factors such as a load disturbance, system parameter changes and an electromagnetic torque ripple caused by the fault are all considered;

step 4) detecting the five-phase currents $i_A$, $i_B$, $i_C$, $i_D$, and $i_E$ of the five-phase permanent magnet fault-tolerant motor, and obtaining current components $i_{d1}$, $i_{q1}$, $i_{d3}$ and $i_{q3}$ in a two-phase rotating coordinate system through Clark and Park transforms;

where, the current components of the five-phase permanent magnet fault-tolerant motor in the two-phase rotating coordinate system are expressed as follows:

$$\begin{bmatrix} i_{d1} \\ i_{q1} \\ i_{d3} \\ i_{q3} \end{bmatrix} =$$

$$\begin{bmatrix} \cos\theta & \cos(\theta-\gamma) & \cos(\theta-2\gamma) & \cos(\theta-3\gamma) & \cos(\theta-4\gamma) \\ -\sin\theta & -\sin(\theta-\gamma) & -\sin(\theta-2\gamma) & -\sin(\theta-3\gamma) & -\sin(\theta-4\gamma) \\ \cos3\theta & \cos3(\theta-\gamma) & \cos3(\theta-2\gamma) & \cos3(\theta-3\gamma) & \cos3(\theta-4\gamma) \\ -\sin3\theta & -\sin3(\theta-\gamma) & -\sin3(\theta-2\gamma) & -\sin3(\theta-3\gamma) & -\sin3(\theta-4\gamma) \end{bmatrix} \begin{bmatrix} i_A \\ i_B \\ i_C \\ i_D \\ i_E \end{bmatrix}$$

step 5) calculating direct-axis and quadrature-axis fundamental voltages of the VC drive system and the DTC drive system based on the current components $i_{d1}$ and $i_{q1}$ in the two-phase rotating coordinate system and the predetermined torque $T_e^*$;

step 6) obtaining direct-axis and quadrature-axis third harmonic voltages through the current components $i_{d3}$ and $i_{q3}$ in the two-phase rotating coordinate system, based on a control strategy of zero third harmonic current;

step 7) calculating winding phase voltages in a fault mode based on the fault-tolerant mechanism and the direct-axis and quadrature-axis voltages;

step 8) obtaining predetermined phase voltages in a fault-tolerant operation mode based on a back-electromotive force (EMF) and the winding phase voltages in the fault mode; and step 9) processing the predetermined phase voltages by a voltage source inverter, and achieving undisturbed operation of the VC drive system and the DTC drive system of the five-phase permanent magnet fault-tolerant motor under any open-circuit fault through chaotic pulse width modulation (CPWM).

The present disclosure has the following beneficial effects:

1) The present disclosure proposes for the first time a unified open-circuit fault-tolerant control strategy suitable for a VC drive system and a DTC drive system. The present disclosure essentially reveals the fault-tolerant mechanism, and realizes the fault-tolerant operation of the systems in different open-circuit fault states only according to the predetermined direct-axis and quadrature-axis voltages of the five-phase permanent magnet fault-tolerant motor drive systems. The present disclosure solves the problem of variable and complicated fault-tolerant control schemes corresponding to various basic control algorithms.

2) The present disclosure designs a torque controller, which enables the control systems to have an output torque under open-circuit faults, and have desirable dynamic and static performance, anti-interference ability and robustness under normal and faulty operation, thereby comprehensively improving the operating performance of the motor drive systems.

3) The present disclosure is based on CPWM to achieve undisturbed operation under an open-circuit fault, and effectively solves the problems of traditional fault-tolerant control methods based on hysteresis comparators, such as large harmonic content in the current, large torque ripple and unfixed switching frequency. Compared with fault-tolerant control methods based on space vector pulse width modulation (SVPWM), the present disclosure does not need to distinguish sectors or reconstruct the space voltage vector under a fault, which greatly simplifies the control algorithm. In addition, compared with the existing CPWM-based fault-tolerant control methods, the present disclosure does not need to change coordinate transformation and additional compensation voltage. That is, the present disclosure does not need to change the structure of the control systems, but only needs to change the control strategy of one of the modules to realize fault-tolerant operation under different faults. Therefore, the present disclosure simplifies the control algorithm, minimizes the reconfiguration of the control systems under different faults, and saves the controller's CPU and other memory resources.

4) The present disclosure breaks through the technical constraints of traditional fault-tolerant control, which is generally based on direct-axis and quadrature-axis components of the fundamental current to ensure that the MMF is equal before and after the fault. The present disclosure considers the action mechanism of the direct-axis and quadrature-axis components of the third harmonic current before and after the fault to ensure that the stator flux linkage trajectory is circular, and further improves the current quality under fault-tolerant operation.

5) The present disclosure implements fault-tolerant control in the two-phase rotating coordinate system based on the strategy of "$i_d=0$" control and flux linkage adaptive predetermined point control. The present disclosure ensures that the direct-axis current component of the motor under different operating conditions including fault operating conditions is zero, solves the problem of large loss of the motor under sudden load or fault operating conditions, and effectively improves the efficiency of the motor drive systems.

6) The present disclosure reduces the amount of calculation, and is simple, easy to implement, practical, and convenient for engineering applications.

BRIEF DESCRIPTION OF THE DRAWINGS

FIGS. 3A-3D show current vectors under normal and fault-tolerant operation, where FIG. 3A shows current vectors under normal operation; FIG. 3B shows current vectors when a phase A is open-circuited; FIG. 3C shows current vectors when non-adjacent phases A and C are open-circuited; and FIG. 3D shows current vectors when adjacent two-phases A and B are open-circuited.

FIG. 4A shows a fault-tolerant vector control (VC) drive system; and FIG. 4B shows a fault-tolerant direct torque control (DTC) drive system.

FIG. 5A shows a current waveform; FIG. 5B shows a torque waveform; FIG. 5C shows a speed waveform; FIG. 5D shows a stator flux linkage amplitude waveform; and FIG. 5E shows a direct-axis and quadrature-axis current waveform.

FIG. 6A shows a current waveform; FIG. 6B shows a torque waveform; and FIG. 6C shows a speed waveform.

FIG. 7A shows a current waveform; FIG. 7B shows a torque waveform; FIG. 7C shows a speed waveform; and FIG. 7D shows a stator flux linkage amplitude waveform.

FIG. 8A shows a current waveform; FIG. 8B shows a torque waveform; and FIG. 8C shows a speed waveform.

FIG. 9A shows a current waveform; FIG. 9B shows a torque waveform; and FIG. 9C shows a speed waveform.

DETAILED DESCRIPTION OF THE EMBODIMENTS

To make the objectives, technical solutions and advantages of the present disclosure clearer, the present disclosure is described in further detail below with reference to the drawings and examples. It should be understood that the specific examples described herein are merely intended to explain the present disclosure, rather than to limit the present disclosure.

Figure 1:
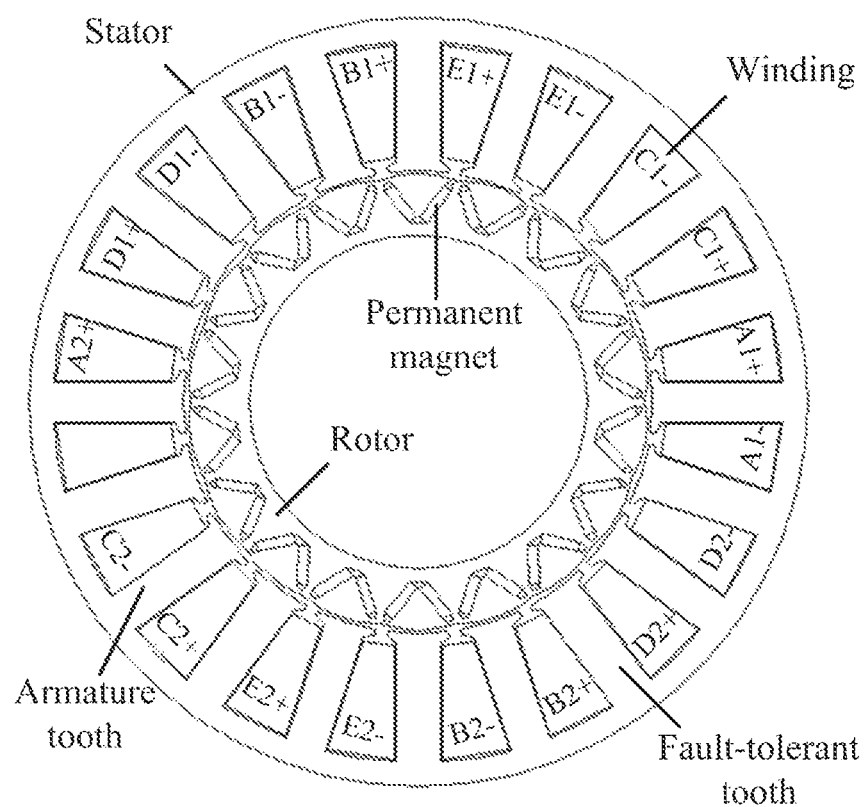
FIG. 1 is a structural view of a five-phase permanent magnet fault-tolerant motor according to the present disclosure.

FIG. 1 is a structural view of a five-phase permanent magnet fault-tolerant motor according to the present disclosure. The five-phase permanent magnet fault-tolerant motor includes a stator, a rotor, permanent magnets, armature teeth, fault-tolerant teeth and armature windings. The armature teeth and the fault-tolerant teeth are evenly spaced along a circumferential direction of an inner ring of the stator, and the armature teeth and the fault-tolerant teeth have different widths. Armature winding coils are wound on the armature teeth to form single-layer concentrated windings, where adjacent single-layer concentrated windings are isolated by the fault-tolerant teeth. The permanent magnets are embedded in the rotor, which are distributed in a "V" shape. There are 20 armature teeth and fault-tolerant teeth in total, and the permanent magnets have 18 poles. Because the stator adopts single-layer concentrated windings, the reluctance of a direct-axis magnetic circuit of the motor is greatly reduced, thereby reducing the salient pole rate of the motor, and making the direct-axis and quadrature-axis inductances close to the same. Because the stator part is provided with the fault-tolerant teeth, the electrical, magnetic and thermal isolation between the windings of each phase is effectively realized, thereby achieving high fault-tolerant performance.

Figure 2:
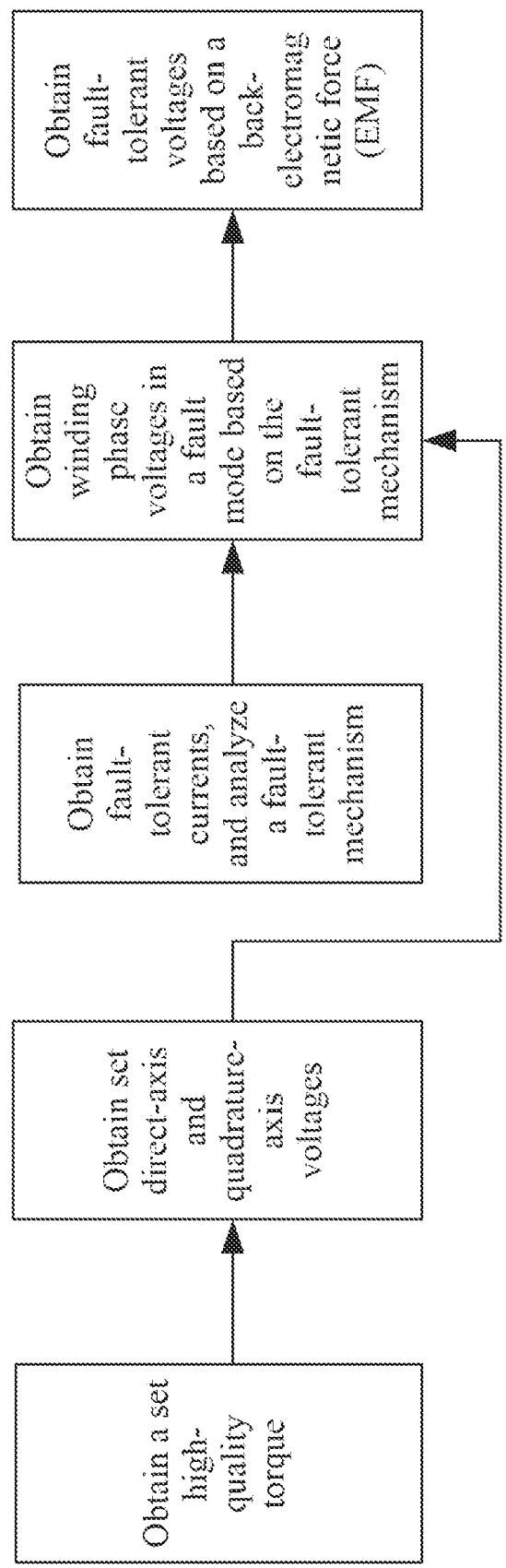
FIG. 2 is a schematic view of a unified open-circuit fault-tolerant control strategy according to the present disclosure.

FIG. 2 is a schematic view of a unified open-circuit fault-tolerant control strategy according to the present disclosure. The unified open-circuit fault-tolerant control strategy includes: obtaining a predetermined torque, obtaining predetermined direct-axis and quadrature-axis voltages, analyzing a fault-tolerant mechanism to obtain fault-tolerant currents, obtaining winding phase voltages in a fault mode based on the fault-tolerant mechanism, and obtaining fault-tolerant voltages based on a back-electromagnetic force (EMF). The unified open-circuit fault-tolerant control strategy specifically includes the following steps.

Step 1) A mathematical model of various currents of a five-phase permanent magnet fault-tolerant motor under normal operation is established.

The currents of the five-phase permanent magnet fault-tolerant motor under normal operation are expressed as follows:

$$\begin{bmatrix} i_A \\ i_B \\ i_C \\ i_D \\ i_E \end{bmatrix} = \begin{bmatrix} \sin\theta & \cos\theta & \sin 3\theta & \cos 3\theta \\ \sin(\theta-\gamma) & \cos(\theta-\gamma) & \sin 3(\theta-\gamma) & \cos 3(\theta-\gamma) \\ \sin(\theta-2\gamma) & \cos(\theta-2\gamma) & \sin 3(\theta-2\gamma) & \cos 3(\theta-2\gamma) \\ \sin(\theta-3\gamma) & \cos(\theta-3\gamma) & \sin 3(\theta-3\gamma) & \cos 3(\theta-3\gamma) \\ \sin(\theta-4\gamma) & \cos(\theta-4\gamma) & \sin 3(\theta-4\gamma) & \cos 3(\theta-4\gamma) \end{bmatrix} \begin{bmatrix} i_{d1}^* \\ i_{q1}^* \\ i_{d3}^* \\ i_{q3}^* \end{bmatrix} \quad (1)$$

where, $\gamma=72°$; $\theta$ is an electrical angle of a rotor position; $i_{d1}^*$ and $i_{q1}^*$ are direct-axis and quadrature-axis components of a predetermined value of a fundamental current; and $i_{d3}^*$ and $i_{q3}^*$ are direct-axis and quadrature-axis components of a predetermined value of a third harmonic current.

Step 2) Fault-tolerant currents under different fault modes, such as an open circuit of a single phase, open circuits of two non-adjacent phases and open circuits of two adjacent phases are obtained, and a fault-tolerant mechanism is analyzed.

A magnetomotive force (MMF) of the five-phase permanent magnet fault-tolerant motor under normal operation is expressed as follows:

$$MMF_1 = Ni_A + \eta Ni_B + \eta^2 Ni_C + \eta^3 Ni_D + \eta^4 Ni_E \quad (2)$$

where, $\eta = \cos\gamma + j\sin\gamma$; N is a number of winding turns; $i_A$, $i_B$, $i_C$, $i_D$, and $i_E$ are currents of phases A, B, C, D, and E of the motor under normal operation.

When a single phase (A) is open-circuited, the current of the faulty phase A is zero. In this case, a magnetomotive force (MMF) of the five-phase permanent magnet fault-tolerant motor is expressed as follows:

$$MMF_2 = \eta Ni_{B1} + \eta^2 Ni_{C1} + \eta^3 Ni_{D1} + \eta^4 Ni_{E1} \quad (2)$$

where, $i_{B1}$, $i_{C1}$, $i_{D1}$, and $i_{E1}$ are currents of the phases B, C, D, and E when the phase A is faulty.

Based on a principle of equal MMF before and after a fault and equal fault-tolerant current amplitude and in consideration of the third harmonic current, current distribution of non-faulty phases except for the phase A is derived as follows:

$$\begin{bmatrix} i_{B1} \\ i_{C1} \\ i_{D1} \\ i_{E1} \end{bmatrix} = T_p \begin{bmatrix} i_{d1}^* \\ i_{q1}^* \\ i_{d3}^* \\ i_{q3}^* \end{bmatrix} \text{ where,} \tag{4}$$

$$T_p = 1.382 \begin{bmatrix} \sin\left(\theta - \frac{\gamma}{2}\right) & \cos\left(\theta - \frac{\gamma}{2}\right) & \sin(3\theta + \gamma) & \cos(3\theta + \gamma) \\ \sin(\theta - 2\gamma) & \cos(\theta - 2\gamma) & \sin(3\theta + 4\gamma) & \cos(3\theta + 4\gamma) \\ \sin(\theta + 2\gamma) & \cos(\theta + 2\gamma) & \sin(3\theta - 4\gamma) & \cos(3\theta - 4\gamma) \\ \sin\left(\theta + \frac{\gamma}{2}\right) & \cos\left(\theta + \frac{\gamma}{2}\right) & \sin(3\theta - \gamma) & \cos(3\theta - \gamma) \end{bmatrix}.$$

Similarly, based on the principle of equal MMF before and after a fault, fault-tolerant currents are calculated in case two adjacent phases are open-circuited and two non-adjacent phases are open-circuited, respectively. The five-phase permanent magnet fault-tolerant motor has no third harmonic current in case two phases are open-circuited, so the third harmonic current is ignored.

The fault-tolerant currents in case two non-adjacent phases (A, C) are open-circuited are as follows:

$$\begin{cases} i_{B2} = 1.382 i_d^* \cos(\theta - \gamma) + 1.382 i_q^* \sin(\theta - \gamma) \\ i_{D2} = -2.236 i_d^* \cos\theta - 2.236 i_q^* \sin\theta \\ i_{E2} = 2.236 i_d^* \cos(\theta + 0.5\gamma) + 2.236 i_q^* \sin(\theta + 0.5\gamma) \end{cases} \tag{5}$$

where, $i_{B2}$, $i_{D2}$, and $i_{E2}$ are currents of the phases B, D, and E when the phases A and C are open-circuited.

The fault-tolerant currents in case two adjacent phases (A, B) are open-circuited are as follows:

$$\begin{cases} i_{C3} = 2.236 i_q^* \cos(\theta - \gamma) + 2.236 i_d^* \sin(\theta - \gamma) \\ i_{D3} = 3.618 i_q^* \cos(\theta + 2\gamma) + 3.618 i_d^* \sin(\theta + 2\gamma) \\ i_{E3} = 2.236 i_q^* \cos\theta + 2.236 i_d^* \sin\theta \end{cases} \tag{6}$$

where, $i_{C3}$, $i_{D3}$, and $i_{E3}$ are currents of the phases C, D, and E when the phases A and B are open-circuited.

According to the current expressions in Eqs. (1) and (4) to (6), the current vectors under normal and fault-tolerant operation are derived, as shown in FIGS. 3A-3D. In the fault-tolerant mode, the fault current vector is zero, and the phase of the non-faulty phase current vector is shifted and the amplitude thereof increases. Therefore, when the five-phase permanent magnet fault-tolerant motor has a fault, a corresponding fault-tolerant control strategy is adopted to ensure that the phase currents meet the relationship shown in FIGS. 3A-3D, so as to ensure the undisturbed operation of the motor under different faults. This is the fault-tolerant mechanism when the five-phase permanent magnet fault-tolerant motor drive systems have a fault.

Step 3) A torque controller is constructed based on a difference between a predetermined speed and a detected speed to obtain a predetermined torque $T_e^*$ so as to suppress a torque ripple of the motor after a fault, where factors such as a load disturbance, system parameter changes and an electromagnetic torque ripple caused by the fault are all considered.

A torque-speed relationship of the five-phase permanent magnet fault-tolerant motor is defined as follows:

$$\frac{d\omega}{dt} = -\frac{B}{J}\omega - \frac{T_L}{J} + \frac{T_e}{J} \tag{7}$$

where, ω is a mechanical angular velocity, B is a friction coefficient, J is a moment of inertia, and $T_L$ is a load torque.

An electromagnetic torque of the five-phase permanent magnet fault-tolerant motor system in a fault mode is expressed as follows:

$$T_e = T_b + \Delta T_e \tag{8}$$

where, $T_b$ denotes an electromagnetic torque without a ripple component, and $\Delta T_e$ denotes an electromagnetic torque with a ripple component caused by a fault. Therefore, $T_b$ is designed to ensure the performance of the five-phase motor systems, and $\Delta T_e$ is considered as an uncertain factor of the systems. A torque control strategy is used to eliminate the disturbing $\Delta T_e$ so as to suppress the torque ripple of the five-phase permanent magnet fault-tolerant motor after a fault.

It is supposed that $\Delta T_e = \alpha_1 T_b$, where $\alpha_1$ is unknown but bounded, with a maximum value of $\alpha_{1m}$, so $\alpha_1$ satisfies $|\alpha_1| \leq \alpha_{1m} < 1$. Therefore, Eq. (7) is rewritten as:

$$\frac{d\omega}{dt} = -\frac{B_m}{J_m}\omega + \left(\frac{B_m}{J_m} - \frac{B}{J}\right)\omega - \frac{T_L}{J} + \frac{1}{J_m}(1 - \alpha_2)(1 + \alpha_1)T_b \tag{9}$$

where, $B_m$ and $J_m$ are respectively a maximum value of B and a minimum value of J, both of which are greater than zero, and are obtained based on an extreme environment of the motor system. $\alpha_2 = 1 - (J_m/J)$, where $\alpha_2$ falls within a range of $0 \leq \alpha_2 < 1$. Let $e = \omega - \omega^*$, $\omega^*$ being a predetermined angular velocity of a rotor, then:

$$\omega = e + \omega^* \tag{10}$$

Thus a relationship is obtained as follows:

$$\frac{de}{dt} = -\frac{B_m}{J_m}e + \left(\frac{B_m}{J_m} - \frac{B}{J}\right)e - \frac{B}{J}\omega^* - \frac{T_L}{J} + \frac{1}{J_m}(1 - \alpha_2)(1 + \alpha_1)T_b \tag{11}$$

A torque controller is designed based on a strong robust control law:

$$T_b = -\frac{\lambda \tau}{|\lambda| + \varepsilon} \tag{12}$$

where, $$\lambda = -\frac{B_m|e| + B_m|\omega^*| + T_m}{(1 - \alpha_{1m})(1 - \alpha_{2m})}; \tau = \frac{e}{J_m}\lambda;$$

$T_m$ is a maximum value of $T_L$, which is greater than zero; and ε is a constant greater than zero.

The designed torque controller comprehensively considers factors such as load disturbance ($T_L$), changes of system parameters (J, B) and electromagnetic torque ripple ($\Delta T_e$) caused by the fault. Therefore, the torque controller can suppress the electromagnetic torque ripple caused by a fault, and has desirable anti-interference performance against uncertain factors such as load disturbance and system parameter changes.

Step 4) The five-phase currents $i_A$, $i_B$, $i_C$, $i_D$, and $i_E$ of the five-phase permanent magnet fault-tolerant motor are detected, and the current components $i_{d1}$, $i_{q1}$, $i_{d3}$, $i_{q3}$ in a two-phase rotating coordinate system are obtained through Clark and Park transforms.

The current components of the five-phase permanent magnet fault-tolerant motor in the two-phase rotating coordinate system are expressed as follows:

$$\begin{bmatrix} i_{d1} \\ i_{q1} \\ i_{d3} \\ i_{q3} \end{bmatrix} = \begin{bmatrix} \cos\theta & \cos(\theta-\gamma) & \cos(\theta-2\gamma) & \cos(\theta-3\gamma) & \cos(\theta-4\gamma) \\ -\sin\theta & -\sin(\theta-\gamma) & -\sin(\theta-2\gamma) & -\sin(\theta-3\gamma) & -\sin(\theta-4\gamma) \\ \cos 3\theta & \cos 3(\theta-\gamma) & \cos 3(\theta-2\gamma) & \cos 3(\theta-3\gamma) & \cos 3(\theta-4\gamma) \\ -\sin 3\theta & -\sin 3(\theta-\gamma) & -\sin 3(\theta-2\gamma) & -\sin(\theta-3\gamma) & -\sin 3(\theta-4\gamma) \end{bmatrix} \begin{bmatrix} i_A \\ i_B \\ i_C \\ i_D \\ i_E \end{bmatrix} \tag{13}$$

Step 5) Direct-axis and quadrature-axis fundamental voltages of the VC drive system and the DTC drive system are calculated based on the current components $i_{d1}$ and $i_{q1}$ in the two-phase rotating coordinate system and the predetermined torque $T_e^*$.

Part 1: A predetermined quadrature-axis fundamental voltage of the VC drive system is obtained.

Figure 4A:
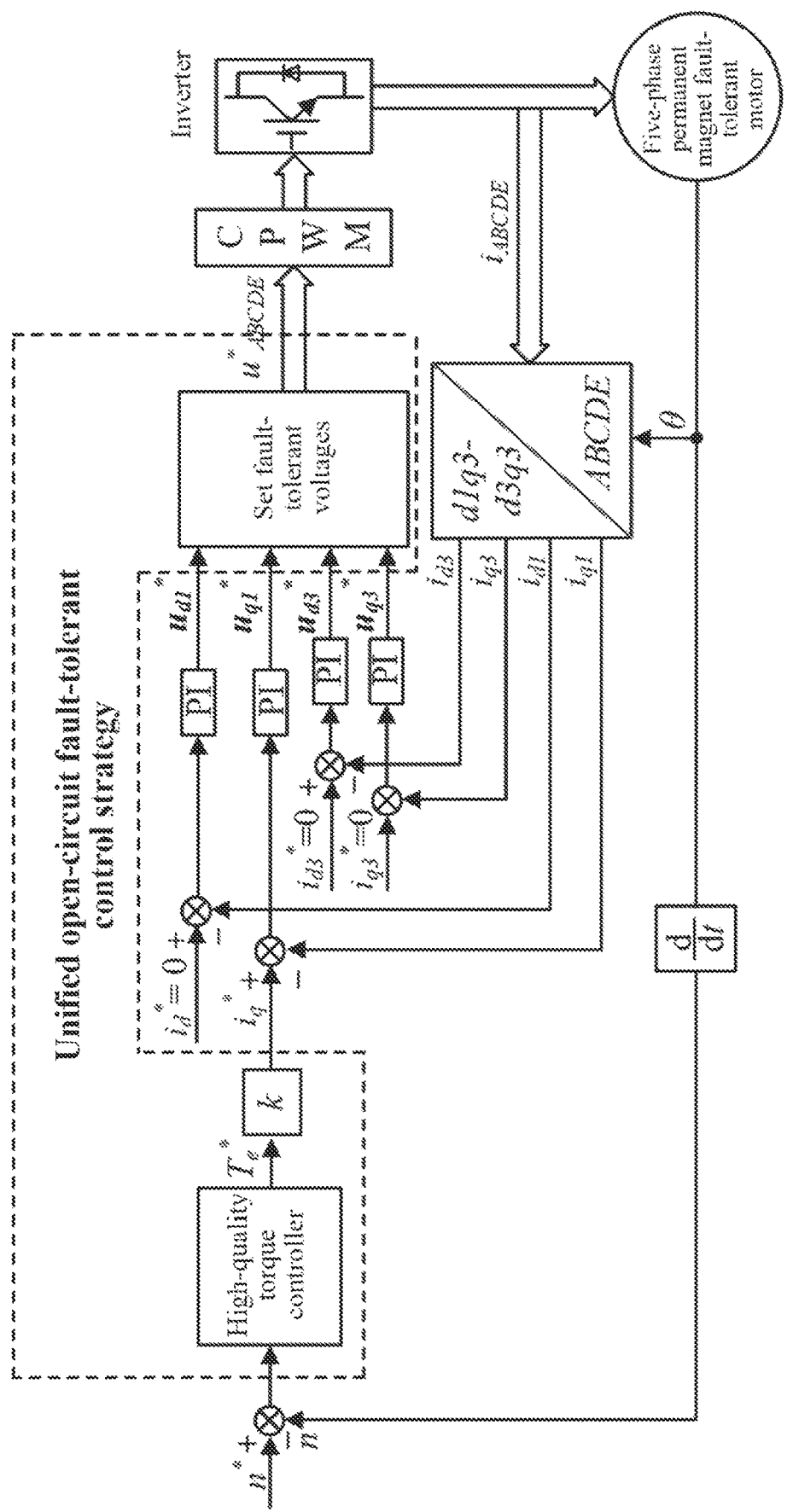
FIGS. 4A and 4B show fault-tolerant control drive systems based on chaotic pulse width modulation (CPWM) for a five-phase permanent magnet fault-tolerant motor, where

FIG. 4A shows a fault-tolerant VC drive system. The predetermined quadrature-axis fundamental voltage of the VC drive system is obtained as follows.

(1) $i_d=0$ control is adopted, and a difference between a predetermined direct-axis current zero and a direct-axis current $i_{d1}$ is input into a proportional integral (PI) controller to obtain a predetermined direct-axis voltage $u_{d1}^*$.

(2) A quadrature-axis current $i_{q1}^*$ is obtained, and a difference between $i_{q1}^*$ and a direct-axis current $i_{q1}$ is input into the PI controller to obtain a predetermined direct-axis voltage $u_{q1}^*$.

The quadrature-axis current $i_{q1}^*$ is calculated as follows:

$$i_{q1}^* = \frac{2T_e^*}{5p_r\psi_f} \tag{14}$$

where, $p_r$ is a number of pole pairs of the motor, and $\psi_f$ is an amplitude of a permanent magnet flux linkage.

Part 2: A predetermined quadrature-axis fundamental voltage of the DTC drive system is obtained.

Figure 4B:
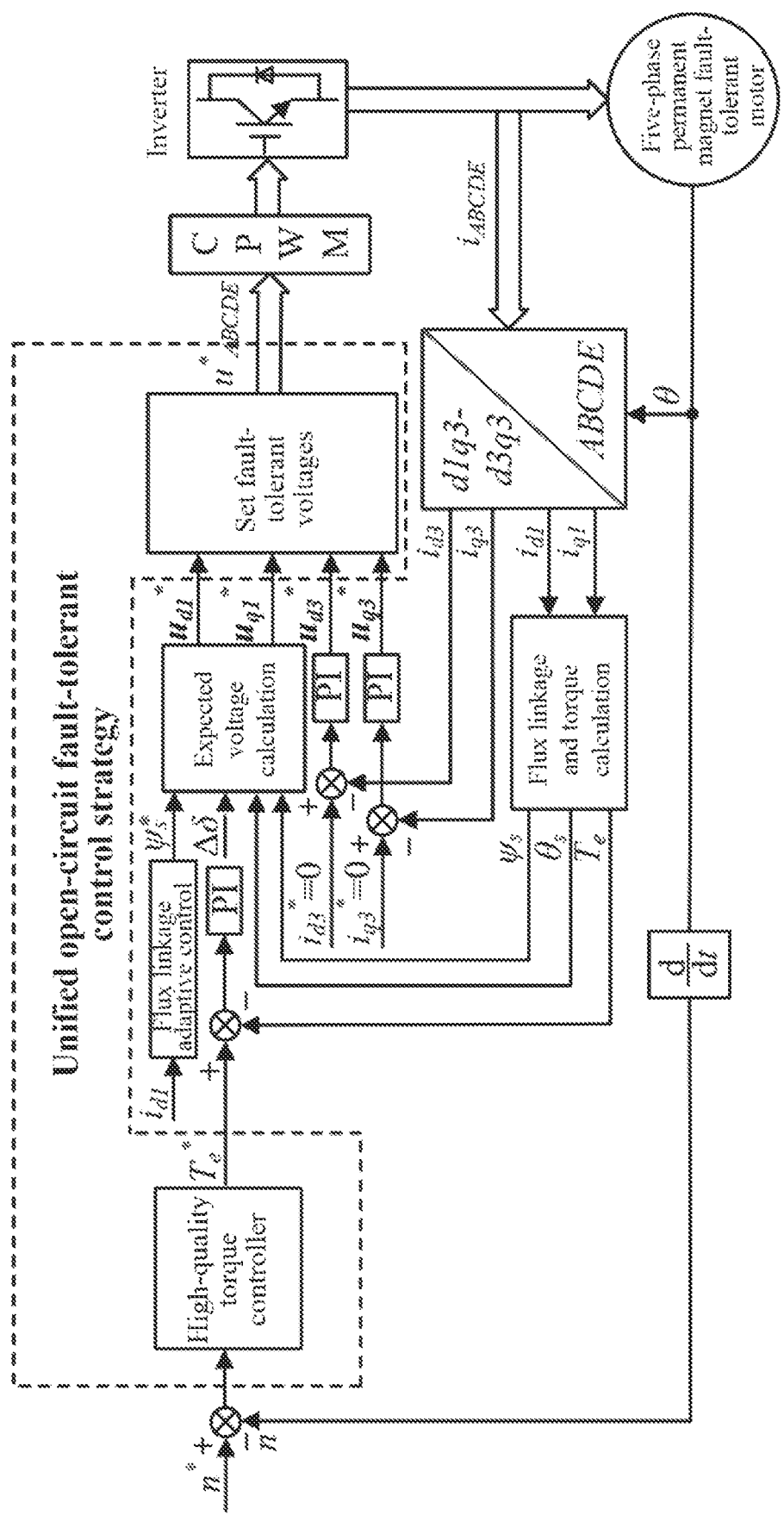
Figure 5A:
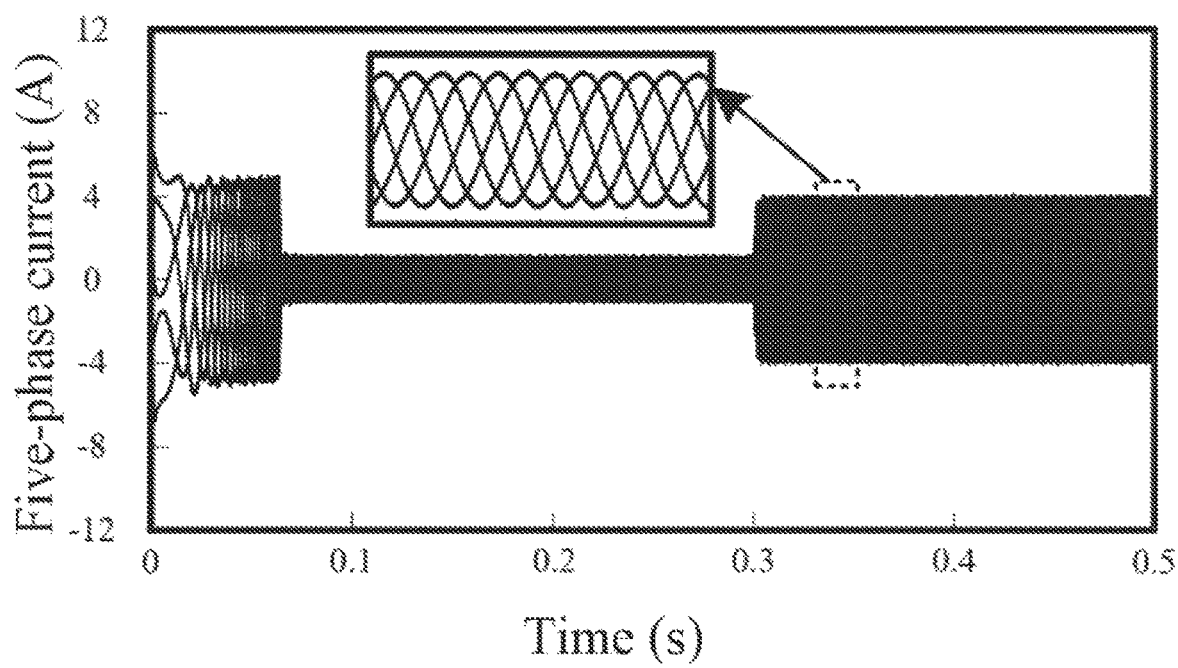
FIGS. 5A-5E show simulated waveforms of the DTC drive system under normal operation with variable load and system parameters, where
Figure 5B:
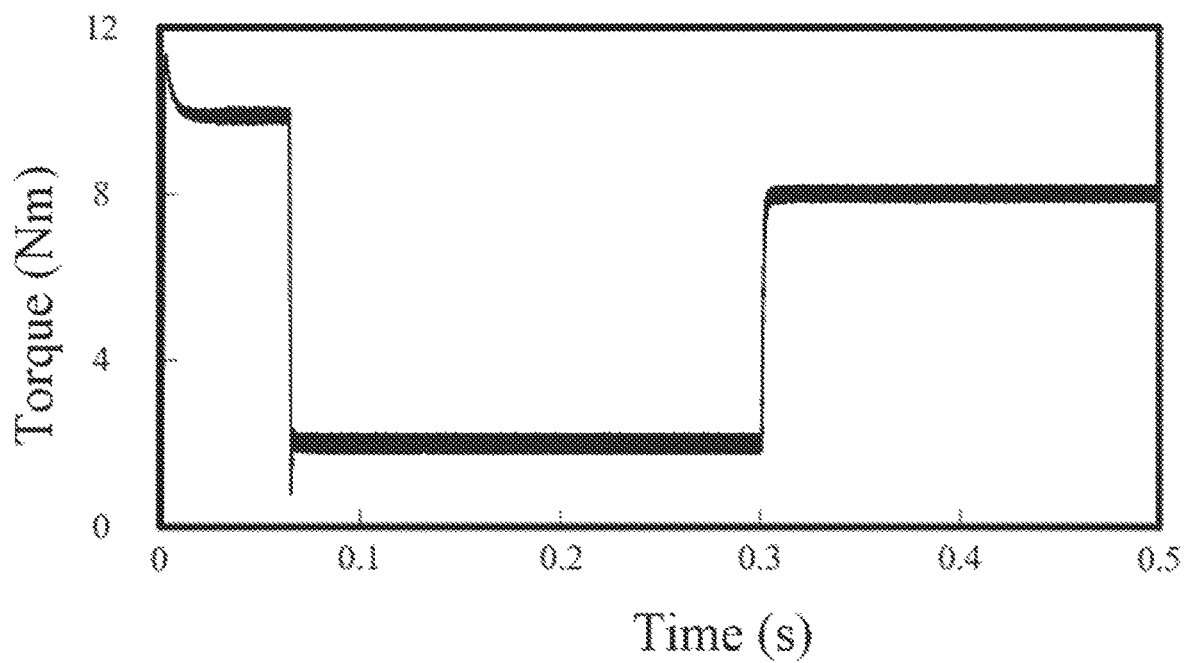
Figure 5C:
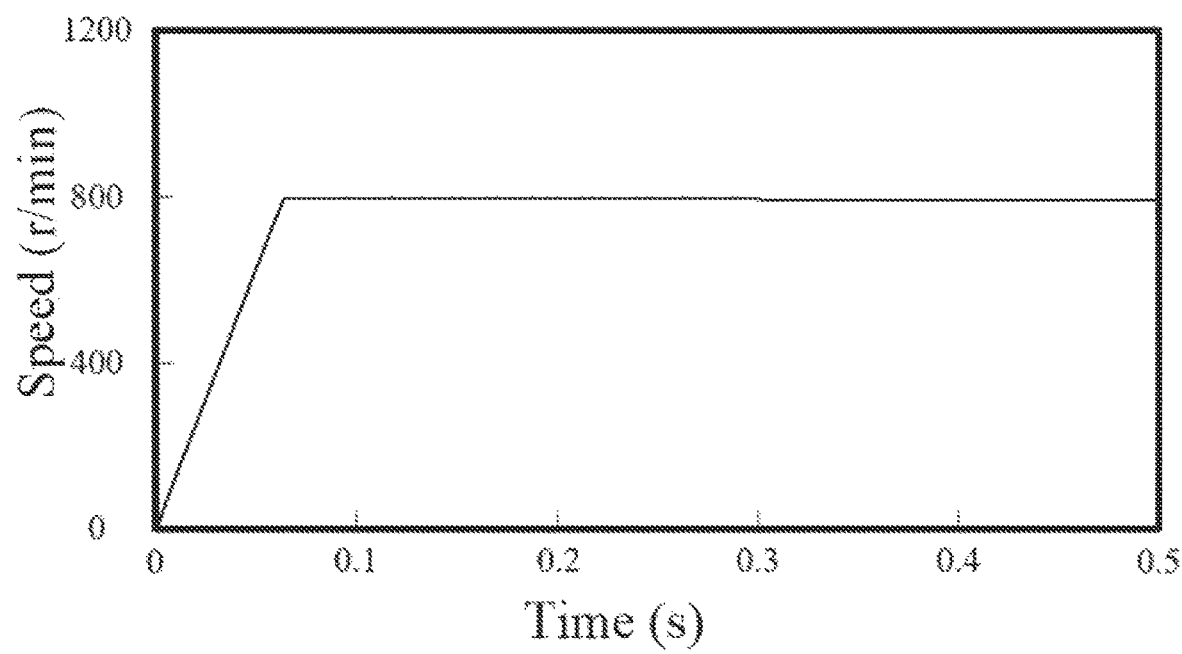
Figure 5D:
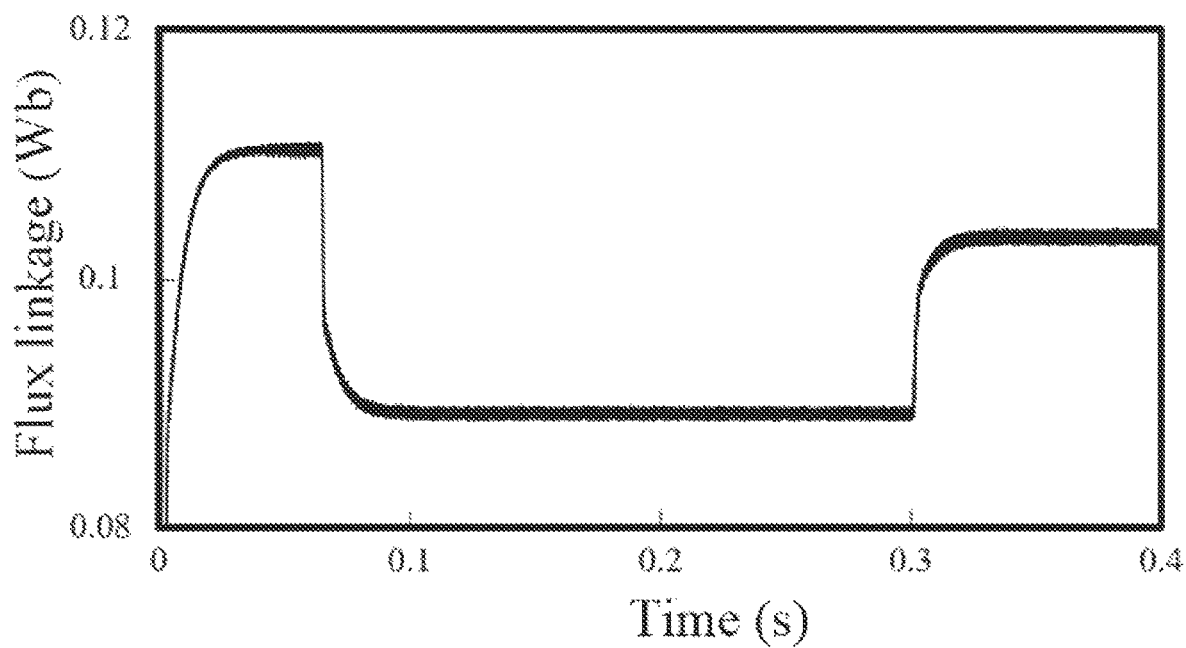
Figure 5E:
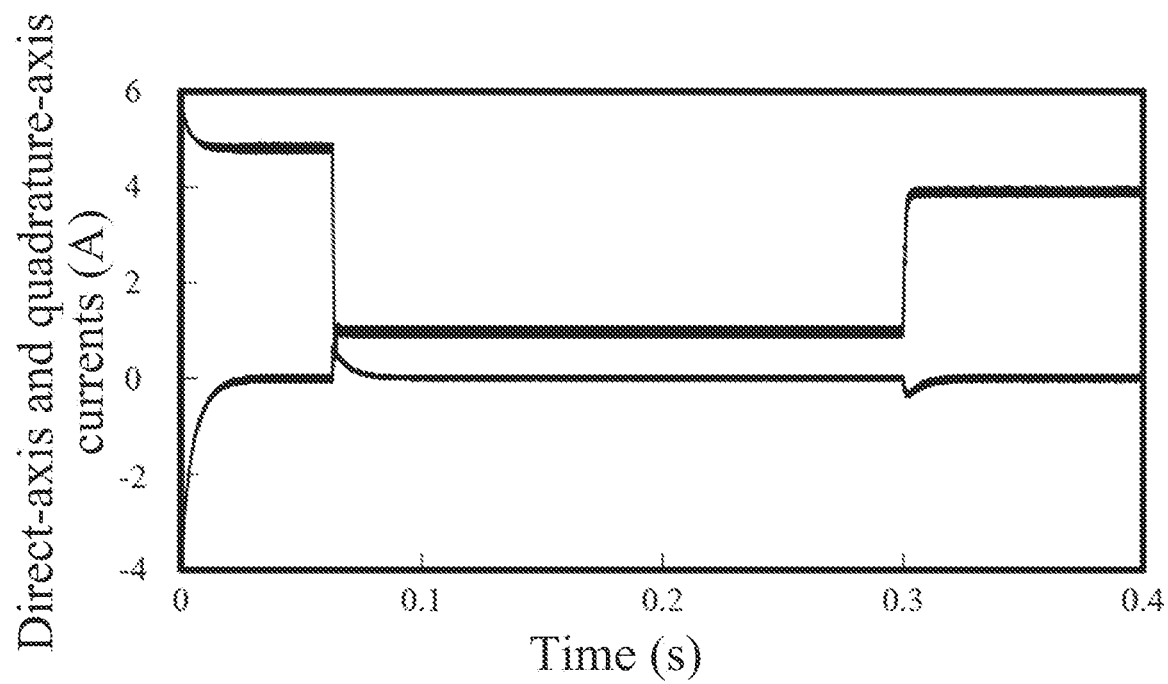
Figure 6A:
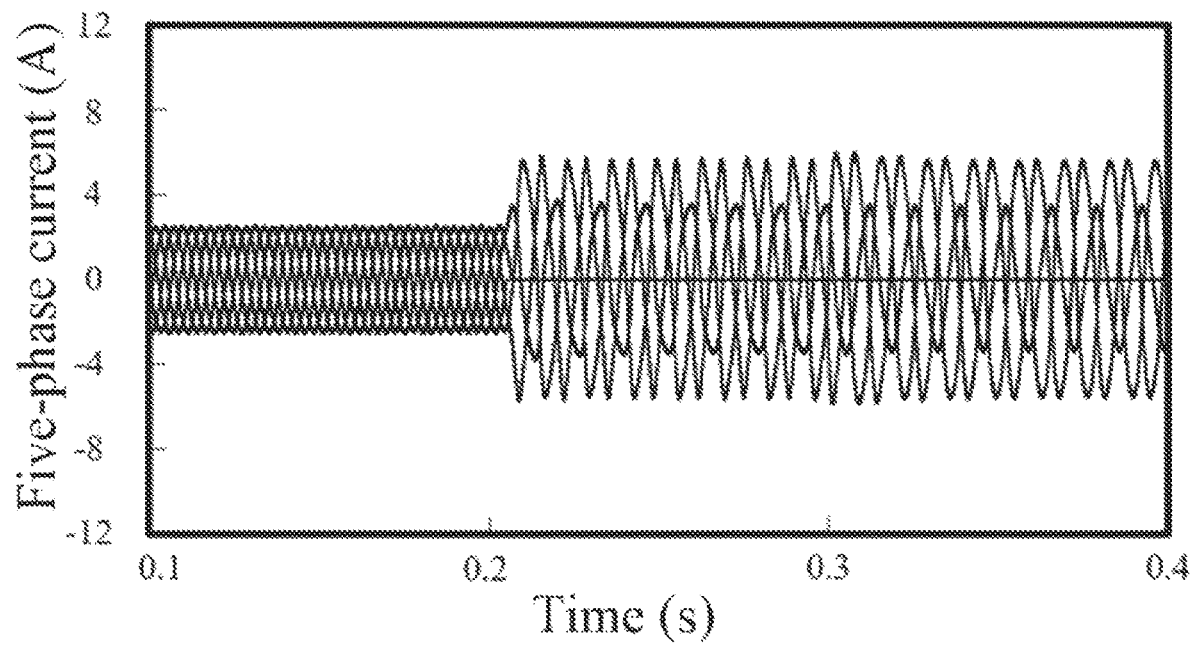
FIGS. 6A-6C show simulated waveforms of the VC drive system under normal operation, and under tolerance-free operation and fault-tolerant operation under open-circuit faults of phases A and C, where
Figure 6B:
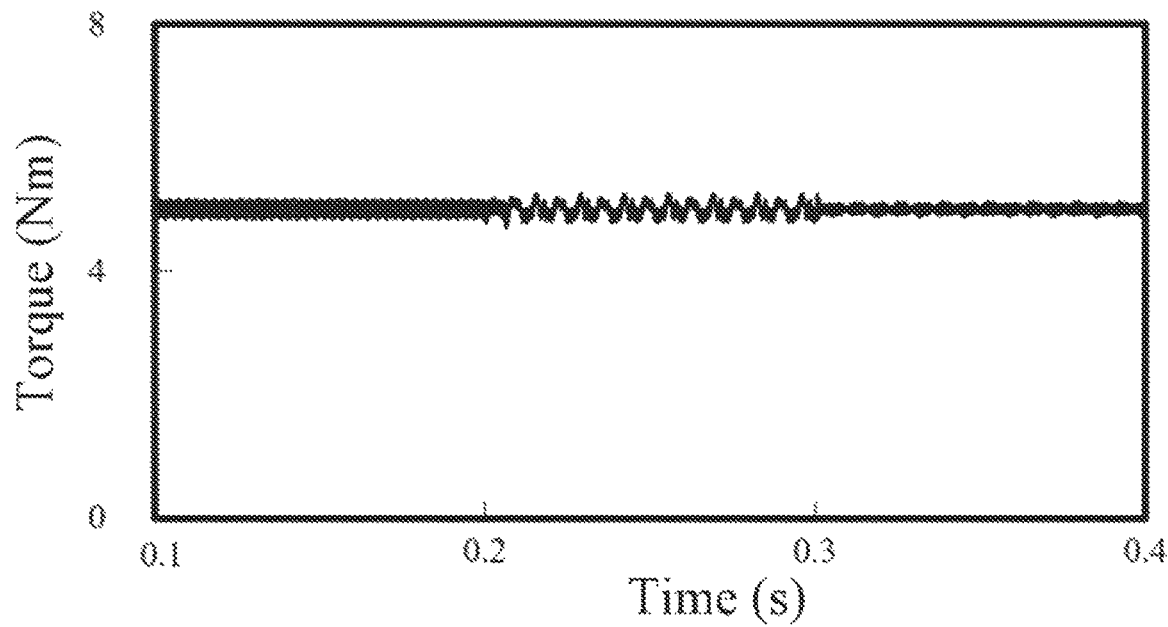
Figure 6C:
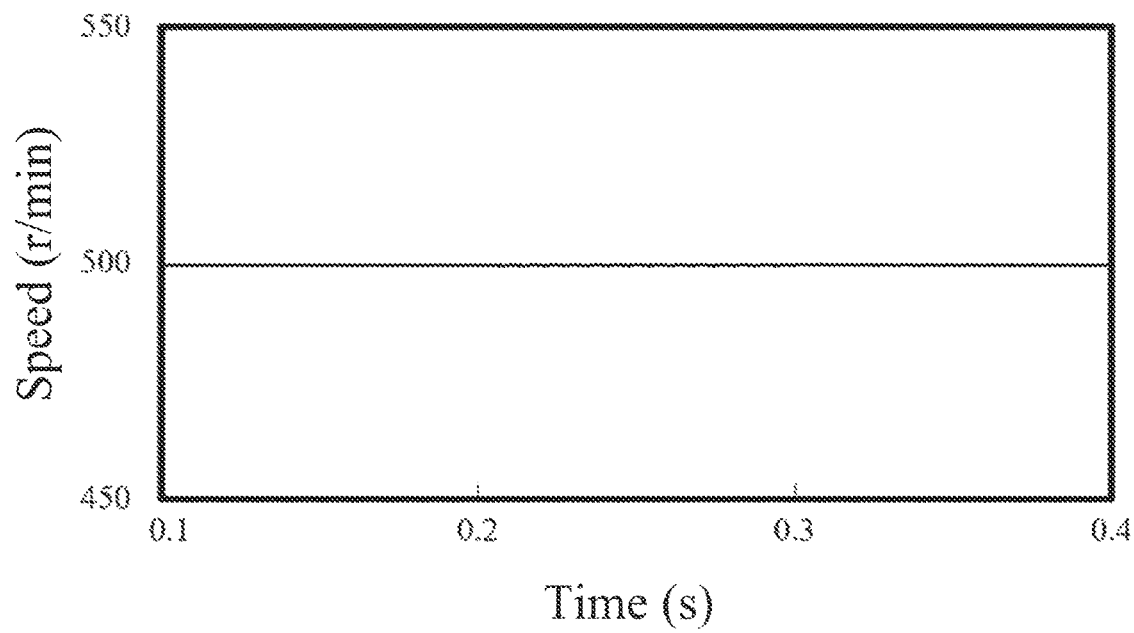
Figure 7A:
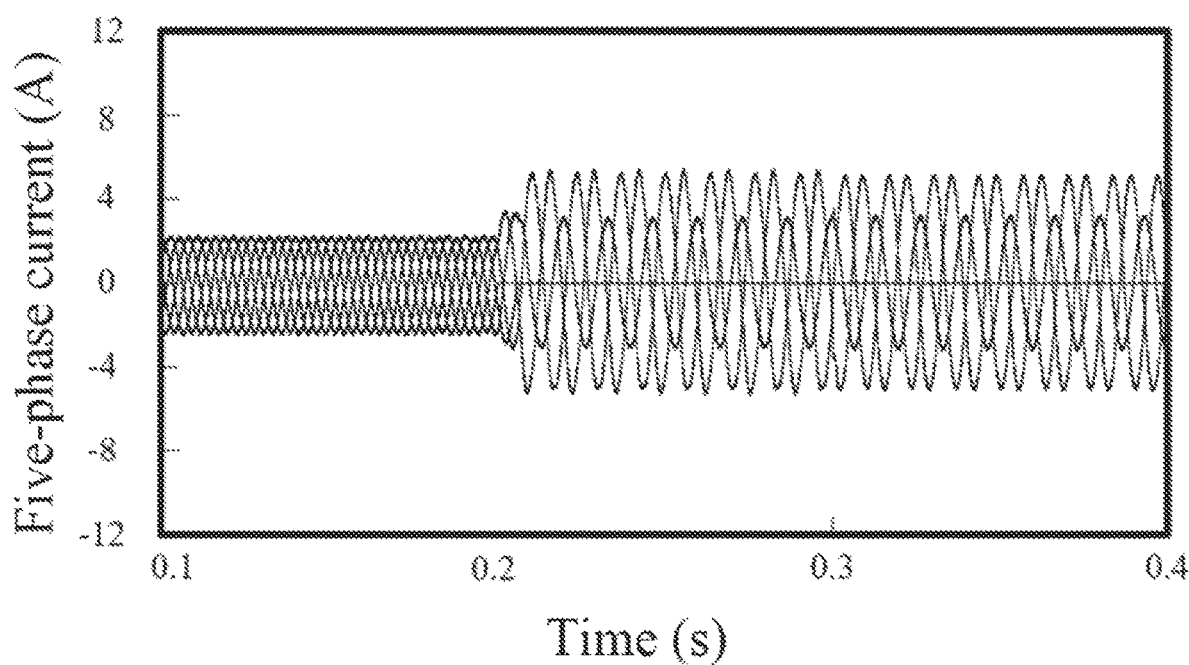
FIGS. 7A-7D show simulated waveforms of the DTC drive system under normal operation, and under tolerance-free operation and fault-tolerant operation under open-circuit faults of phases A and C, where
Figure 7B:
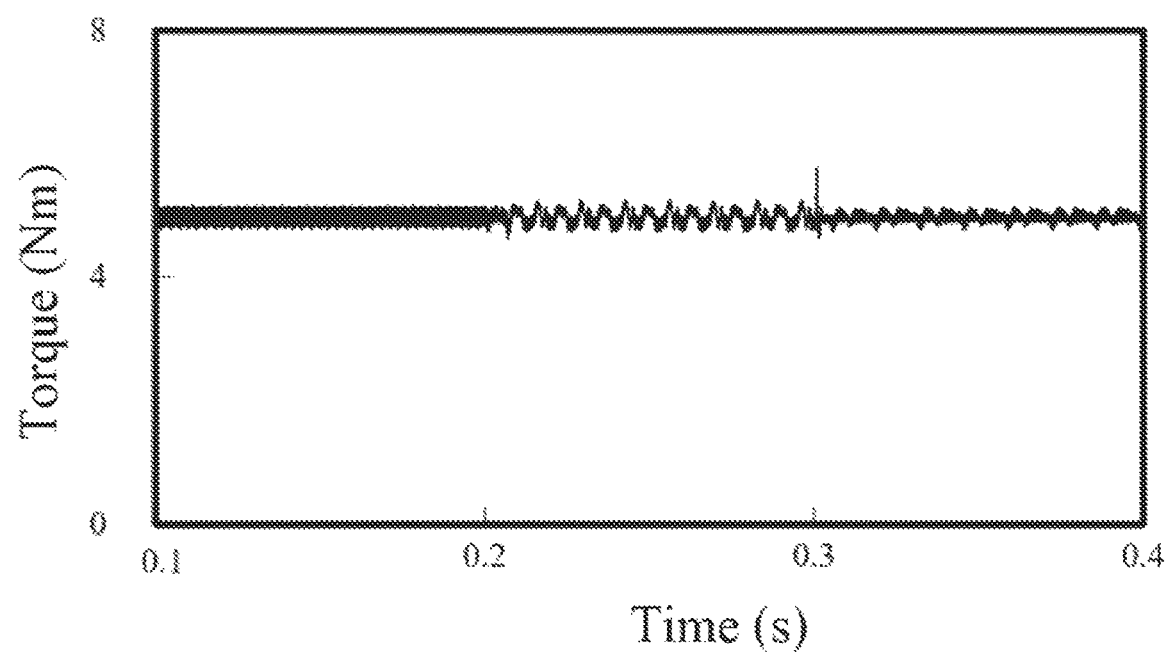
Figure 7C:
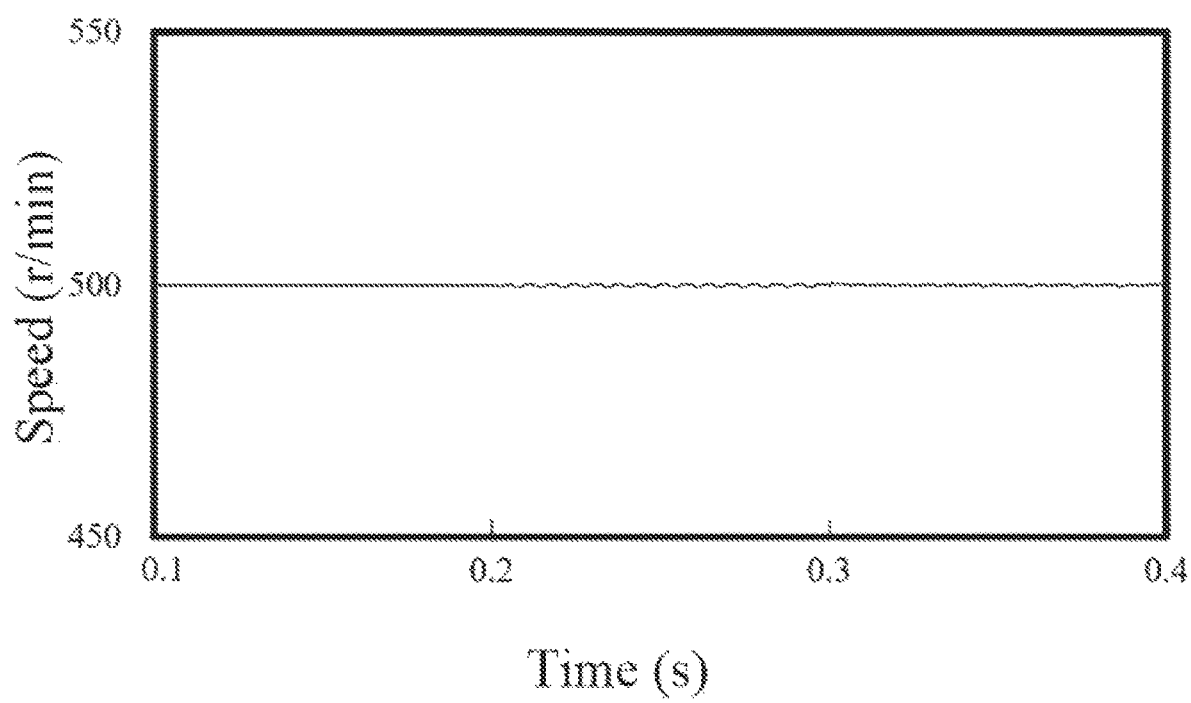
Figure 7D:
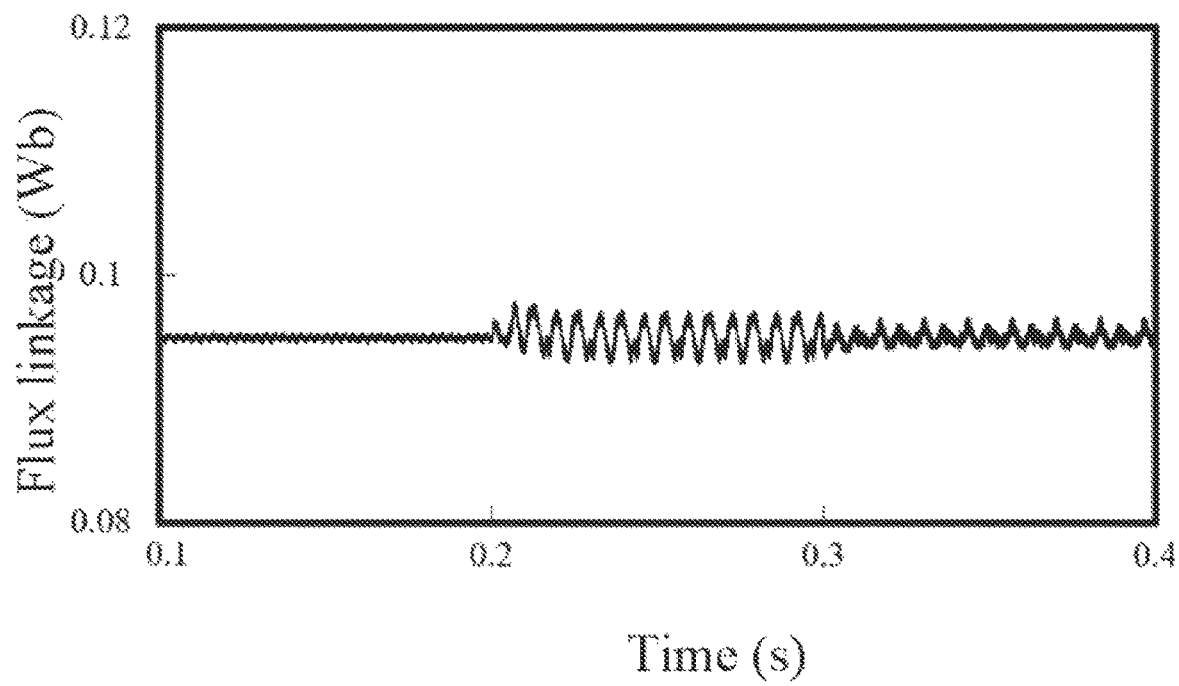
Figure 8A:
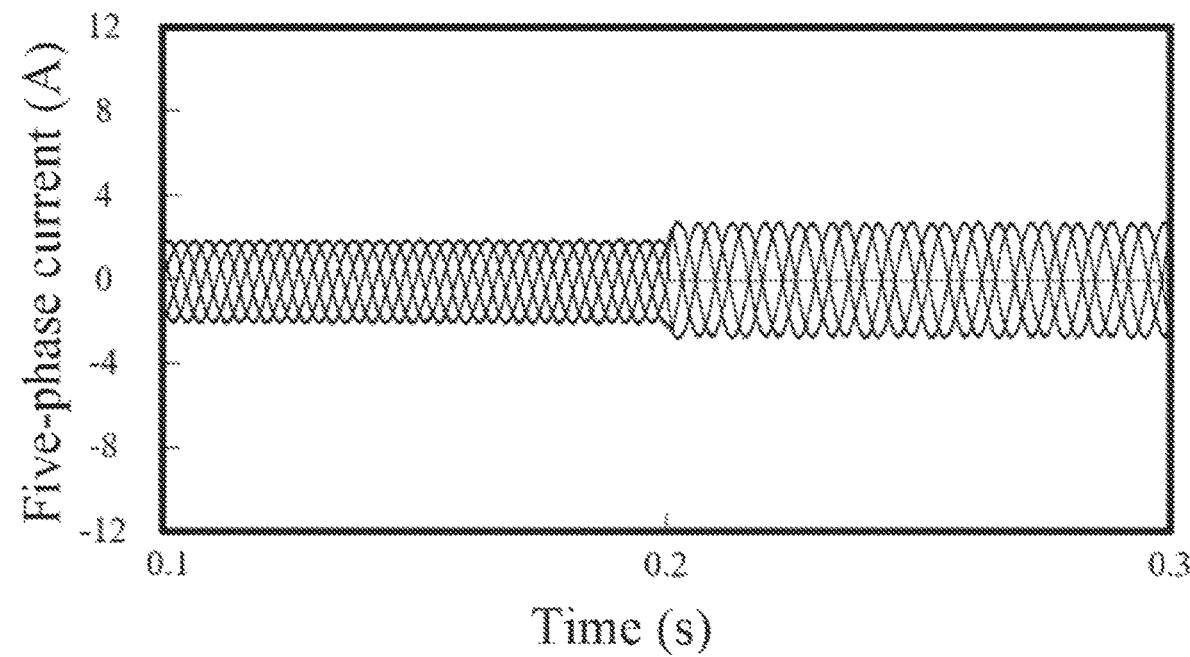
FIGS. 8A-8C show simulated waveforms of the DTC drive system under normal operation, and under tolerance-free operation and fault-tolerant operation under an open-circuit fault of the phase A, where
Figure 8B:
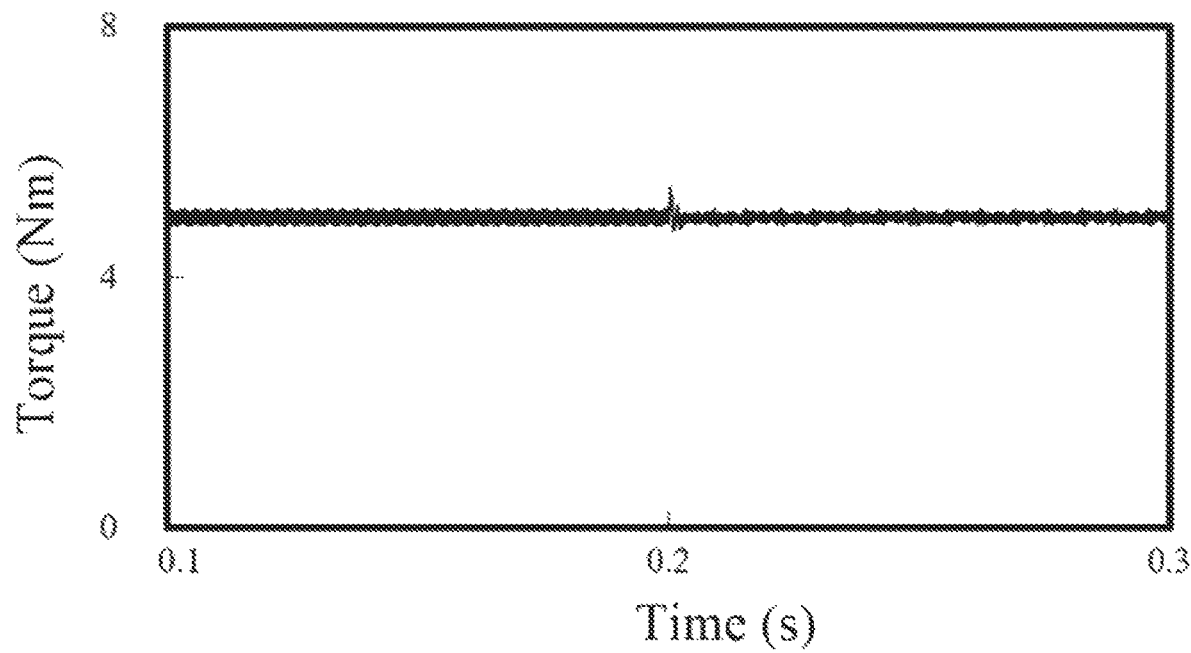
Figure 8C:
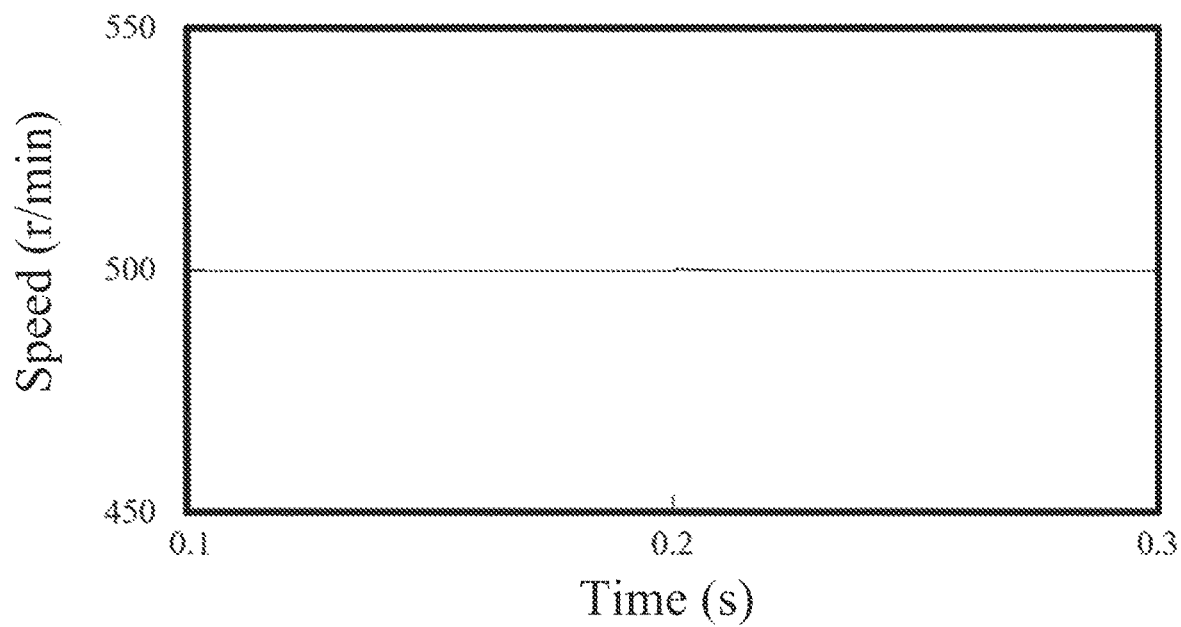
Figure 9A:
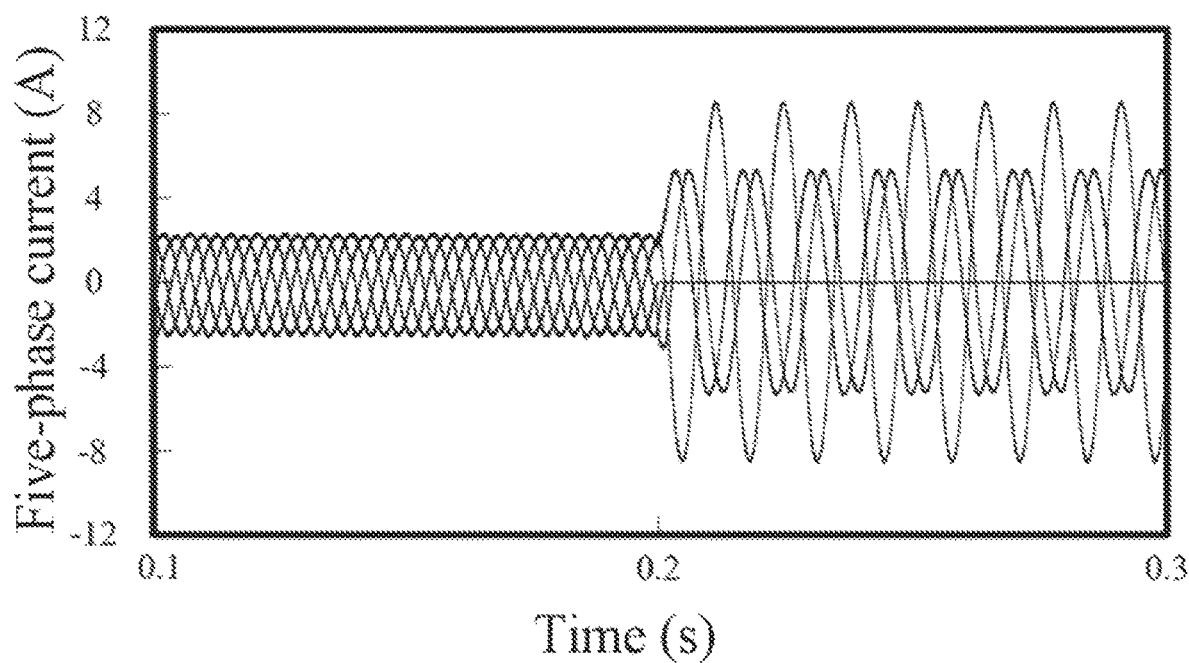
FIGS. 9A-9C shows simulated waveforms of the DTC drive system under normal operation, and under tolerance-free operation and fault-tolerant operation under open-circuit faults of phases A and B, where
Figure 9B:
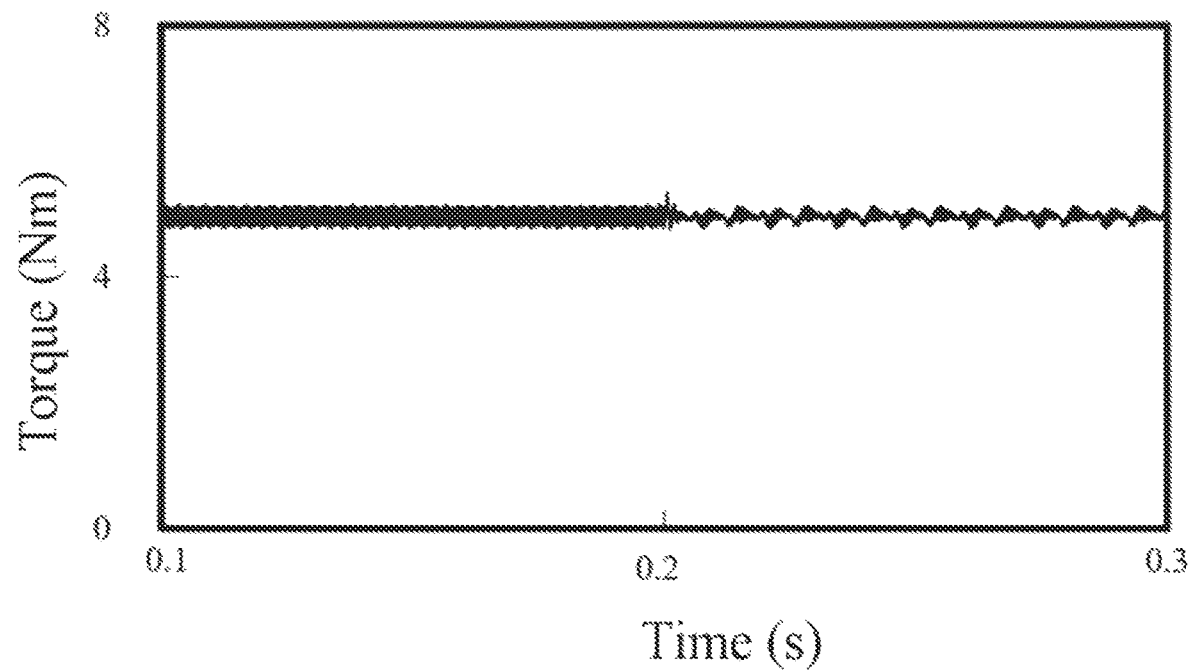
Figure 9C:
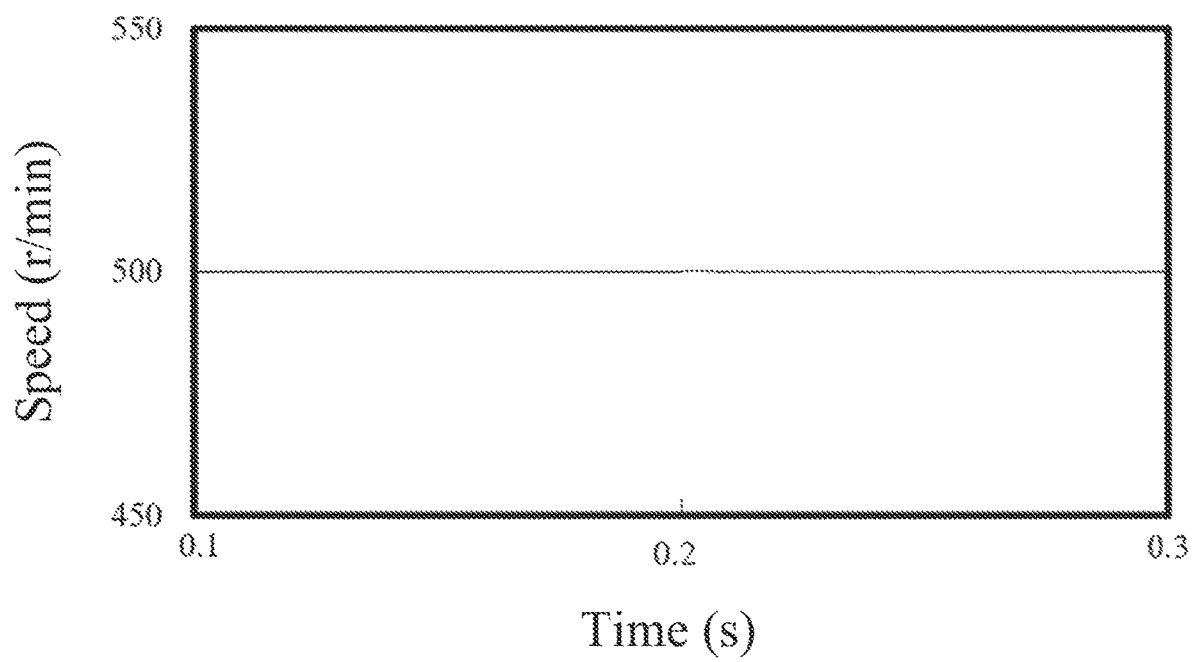

FIG. 4B shows a fault-tolerant DTC drive system. The predetermined quadrature-axis fundamental voltage of the DTC drive system is obtained as follows.

(1) An amplitude, a phase and an estimated torque of a stator flux linkage are calculated through the current components $i_{d1}$ and $i_{q1}$ in the two-phase rotating coordinate system.

Direct-axis and quadrature-axis components of the stator flux linkage are expressed as follows:

$$\begin{cases} \psi_d = L_s i_{d1} + \psi_f \\ \psi_q = L_s i_{q1} \end{cases} \tag{15}$$

where, $L_s$ is a stator inductance.

The amplitude and phase of the stator flux linkage are obtained from the above equation:

$$\begin{cases} \psi_s = \sqrt{\psi_d^2 + \psi_q^2} \\ \delta = \arctan(\psi_d/\psi_q) \end{cases} \tag{16}$$

Based on direct-axis and quadrature-axis inductances of the five-phase permanent magnet fault-tolerant motor that are sub-equal, the estimated torque is calculated as follows:

$$T_e = \frac{5}{2}p_r\psi_f i_{q1} \tag{17}$$

(2) A difference between the predetermined torque $T_e^*$ and the calculated torque is input into a speed PI controller to obtain a torque angle increment $\Delta\delta$, and a predetermined value $\psi_s^*$ of the stator flux linkage is obtained through a flux linkage adaptive control strategy.

The torque equation is rewritten by considering that the electromagnetic torque of the five-phase permanent magnet motor is essentially an interaction result of magnetic fields of a rotor and a stator.

$$T_e = \frac{5}{2}p_r\frac{1}{L_s}\vec{\psi}_f \times \vec{\psi}_s = \frac{5}{2}p_r\frac{1}{L_s}\psi_f\psi_s\sin\delta \tag{18}$$

where, $\psi_f$ is a magnetic field vector of the rotor; $\psi_s$ is a magnetic field vector of the stator; $\delta$ is an angle between the stator flux linkage linkage and the rotor flux linkage linkage, that is, a phase angle of the stator flux linkage linkage.

Taking the derivative of both sides of the above equation leads to:

$$\Delta T_e = \frac{3}{2}p_0\frac{1}{L_s}\psi_f\psi_s\Delta\delta\cos\delta \tag{19}$$

A torque deviation $\Delta T_e$ and the torque angle increment $\Delta\delta$ have a nonlinear relationship. Thus, the torque angle increment $\Delta\delta$ is obtained by inputting $\Delta T_e$ into the PI controller.

In addition, if the predetermined stator flux linkage is a fixed value, when the motor is operating with no load or sudden heavy load, an additional direct-axis current component is needed to maintain the stator flux linkage unchanged. The additional direct-axis current component will increase the motor loss and reduces system efficiency. In order to solve the above problem, the present disclosure inputs the difference between the direct-axis current $i_{d1}$ and zero into the PI controller to obtain the predetermined stator flux linkage. Therefore, the predetermined stator flux linkage is adaptively adjustable based on the load to ensure that the direct-axis current component is zero when the motor is operating under different conditions.

(3) The amplitude, the phase, the torque angle increment $\Delta\delta$ and the predetermined value $\psi_s^*$ of the stator flux linkage are calculated by an expected voltage, and reference values of the direct-axis and quadrature-axis fundamental voltages $u_{d1}^*$ and $u_{q1}^*$ in the two-phase rotating coordinate system are obtained.

The reference values of the direct-axis and quadrature-axis fundamental voltages are expressed based on the equations of the direct-axis and quadrature-axis voltages of the five-phase permanent magnet fault-tolerant motor.

$$\begin{cases} u_{d1}^* = R_s i_{d1} + \dfrac{\psi_s^* \cos(\delta + \Delta\delta) - \psi_s \cos\delta}{\Delta T} \\ u_{q1}^* = R_s i_{q1} + \dfrac{\psi_s^* \sin(\delta + \Delta\delta) - \psi_s \sin\delta}{\Delta T} \end{cases} \quad (20)$$

Step 6) Direct-axis and quadrature-axis third harmonic voltages are obtained through the current components $i_{d3}$ and $i_{q3}$ in the two-phase rotating coordinate system, based on a control strategy of zero third harmonic current.

Specifically, differences between the current components $i_{d3}$ and $i_{q3}$ in the two-phase rotating coordinate system and zero are respectively input into the PI controller to obtain corresponding direct-axis and quadrature-axis third harmonic voltages.

Step 7) Winding phase voltages in a fault mode are calculated based on the fault-tolerant mechanism and the direct-axis and quadrature-axis voltages.

The phase voltages of the five-phase permanent magnet fault-tolerant motor are expressed as follows:

$$u_x = R_s i_x + L_s \frac{d}{dt} i_x + e_x \quad (21)$$

where, x=A, B, C, D, E; $R_s$ is a stator resistance, $i_x$ is a phase current; and $e_x$ is a back-electromotive force (EMF).

The expression of the phase voltage is rewritten as follows:

$$u_{xe} = u_x - e_x = R_s i_x + L_s \frac{d}{dt} i_x \quad (22)$$

When the five-phase fault-tolerant motor has a fault, the expression can be expressed by direct-axis and quadrature-axis voltages. Thus, expression of the phase voltages under different faults is obtained. When a winding of the phase A is faulty, the phase voltages are expressed as follows:

$$\begin{bmatrix} u_{Be1} \\ u_{Ce1} \\ u_{De1} \\ u_{Ee1} \end{bmatrix} = T_p \begin{bmatrix} u_{ed1}^* \\ u_{eq1}^* \\ u_{ed3}^* \\ u_{eq3}^* \end{bmatrix} \quad (23)$$

In addition, $u_{A1}=0$. $u_{Ae1}$, $u_{Be1}$, $u_{Ce1}$, $u_{De1}$ and $u_{Ee1}$ are phase voltages when the phase A is faulty, which do not consider the back-EMF. $u_{ed1}^*=u_{d1}^*-e_{d1}^*$, $u_{eq1}^*=u_{q1}^*-e_{q1}^*$, $u_{ed3}^*=u_{d3}^*-e_{d3}^*$, $u_{eq1}^*=u_{q3}^*-e_{q3}$. $e_{d1}^*$, $e_{q1}^*$, $e_{d3}^*$ and $e_{q3}^*$ are back-EMF-based direct-axis and quadrature-axis components of the phase voltages, which are obtained through the back-EMF by a coordinate transformation matrix of a five-phase stationary coordinate system to the two-phase rotating coordinate system.

When windings of the phases A and C are faulty, the phase voltages are expressed as follows:

$$\begin{cases} u_{Ae2} = 0 \\ u_{Be2} = 1.382 u_{eq1}^* \cos(\theta - \gamma) + 1.382 u_{ed1}^* \sin(\theta - \gamma) \\ u_{Ce2} = 0 \\ u_{De2} = -2.236 u_{eq1}^* \cos\theta - 2.236 u_{ed1}^* \sin\theta \\ u_{Ee2} = 2.236 u_{eq1}^* \cos(\theta + 0.5\gamma) + 2.236 u_{ed1}^* \sin(\theta + 0.5\gamma) \end{cases} \quad (24)$$

When windings of the phases A and B are faulty, the phase voltages are expressed as follows:

$$\begin{cases} u_{Ae3} = 0 \\ u_{Be3} = 0 \\ u_{Ce3} = 2.236 u_{eq1}^* \cos(\theta - \gamma) + 2.236 u_{ed1}^* \sin(\theta - \gamma) \\ u_{De3} = 3.618 u_{eq1}^* \cos(\theta + 2\gamma) + 3.618 u_{ed1}^* \sin(\theta + 2\gamma) \\ u_{Ee3} = 2.236 u_{eq1}^* \cos\theta + 2.236 u_{ed1}^* \sin\theta \end{cases} \quad (25)$$

where, $u_{Ae3}$, $u_{Be3}$, $u_{Ce3}$, $u_{De3}$, and $u_{Ee3}$ are phase voltages when the windings of the phases A and B are faulty, which do not consider the back-EMF.

Step 8) predetermined phase voltages in a fault-tolerant operation mode are obtained based on an EMF and the winding phase voltages in the fault mode.

The back-EMF of the five-phase permanent magnet fault-tolerant motor remains unchanged under an open-circuit fault and under normal operation. Because the amplitude of the permanent magnet flux linkage of the five-phase permanent magnet fault-tolerant motor changes little and the back-EMF has a small harmonic content, the back-EMF of the five phases is expressed as follows:

$$\begin{bmatrix} e_A \\ e_B \\ e_C \\ e_D \\ e_E \end{bmatrix} = -\omega_e \psi_f \begin{bmatrix} \sin\theta \\ \sin(\theta - \gamma) \\ \sin(\theta - 2\gamma) \\ \sin(\theta - 3\gamma) \\ \sin(\theta - 4\gamma) \end{bmatrix} \quad (26)$$

where, $\psi_f$ is the amplitude of the permanent magnet flux linkage, and $\omega_e$ is the electrical angular velocity.

Substituting the back-EMF into Eq. (22) leads to corresponding predetermined values of the fault-tolerant voltages under different fault modes. When a winding of the phase A is faulty, the predetermined fault-tolerant phase voltages are expressed as follows:

$$\begin{bmatrix} u_B^* \\ u_C^* \\ u_D^* \\ u_E^* \end{bmatrix} = T_P \begin{bmatrix} u_{ed1}^* \\ u_{eq1}^* \\ u_{ed3}^* \\ u_{eq3}^* \end{bmatrix} + \begin{bmatrix} e_B \\ e_C \\ e_D \\ e_E \end{bmatrix} \quad (27)$$

In addition, $u_A^* = e_A$.

When windings of the phases A and C are faulty, the predetermined fault-tolerant phase voltages are expressed as follows:

$$\begin{cases} u_A^* = e_A \\ u_B^* = 1.382 u_{eq}^* \cos(\theta - \gamma) + 1.382 u_{ed}^* \sin(\theta - \gamma) + e_B \\ u_C^* = e_C \\ u_D^* = -2.236 u_{eq}^* \cos\theta - 2.236 u_{ed}^* \sin\theta + e_D \\ u_E^* = 2.236 u_{eq}^* \cos(\theta + 0.5\gamma) + 2.236 u_{ed}^* \sin(\theta + 0.5\gamma) + e_E \end{cases} \quad (28)$$

When windings of the phases A and B are faulty, the predetermined fault-tolerant phase voltages are expressed as follows:

$$\begin{cases} u_A^* = e_A \\ u_B^* = e_B \\ u_C^* = 2.236 u_{eq1}^* \cos(\theta - \gamma) + 2.236 u_{ed1}^* \sin(\theta - \gamma) + e_C \\ u_D^* = 3.618 u_{eq1}^* \cos(\theta + 2\gamma) + 3.618 u_{ed1}^* \sin(\theta + 2\gamma) + e_D \\ u_E^* = 2.236 u_{eq1}^* \cos\theta + 2.236 u_{ed1}^* \sin\theta + e_E \end{cases} \quad (29)$$

Therefore, when the direct-axis and quadrature-axis voltages $u_d^*$ and $u_q^*$ of the five-phase permanent magnet fault-tolerant motor drive system are known, based on the expressions of the predetermined fault-tolerant phase voltages, Eqs. (27) to (29), the fault-tolerant operation of the system is achieved in case of an open-circuit fault of a motor winding.

Step 9) The predetermined phase voltages are processed by a voltage source inverter, and undisturbed operation of the VC drive system and the DTC drive system of the five-phase permanent magnet fault-tolerant motor under any open-circuit fault is achieved through chaotic pulse width modulation (CPWM).

It is worth noting that no matter what basic control algorithm is adopted, only the corresponding predetermined direct-axis and quadrature-axis voltages need to be processed through the unified open-circuit fault-tolerant control strategy to realize the undisturbed operation of the five-phase permanent magnet fault-tolerant motor under an open-circuit fault. This avoids the problem of complicated fault-tolerant control strategies caused by different basic control algorithms.

FIGS. 5A-5E show simulated waveforms of the drive system under normal operation with variable load and system parameters. The motor is operating according to the following parameters, speed: 800 r/min; initial load: 2 N·m, suddenly changing to 8 N·m at 0.3 s; and moment of inertia: twice the original. The simulation results show that the currents of the drive system are sinusoidal, and the sudden load and moment of inertia have almost no effect on the system operation, indicating desirable resistance of the control method to load disturbance and system parameter changes. In addition, during the entire operation, the stator flux linkage changes adaptively to ensure that the direct-axis current is zero, thereby improving the efficiency of the motor.

FIGS. 6A-6C and FIGS. 7A-7D respectively show simulation results of the VC drive system and the DTC drive system under open-circuit faults of two non-adjacent phases (A, C). The motors are operating according to a speed of 500 r/min and a load of 5 N·m. The fault occurs to the motors at 0.2 s, and the fault-tolerant control strategy is adopted at 0.3 s. When the fault occurs at 0.2 s, the current of the faulty phase becomes zero, the electromagnetic torque and flux linkage ripples increase significantly, and the speed begins to fluctuate. When the fault-tolerant control strategy is adopted at 0.3 s, the speed quickly returns to the reference value; the current becomes sinusoidal, which is consistent with the theoretical value in Eq. (5); the torque is quickly stable, and the torque ripple is greatly reduced compared to that under the fault; and the flux linkage ripple is also significantly reduced. FIGS. 8A-8C and FIGS. 9A-9C respectively show simulation results of the DTC drive system under an open-circuit fault of a single phase (A) and under open-circuit faults of two adjacent phases (A, B). This shows the effectiveness of the unified fault-tolerant control strategy adopted after the fault.

In summary, the present disclosure provides a unified open-circuit fault-tolerant control method for a VC drive system and a DTC drive system of a five-phase permanent magnet fault-tolerant motor. The present disclosure is based on CPWM to propose the unified open-circuit fault-tolerant control strategy suitable for the VC drive system and the DTC drive system. The present disclosure essentially reveals the fault-tolerant mechanism, and solves the problem of variable and complicated fault-tolerant control schemes corresponding to various basic control algorithms. The present disclosure designs a torque controller, which enables the control systems to have an output torque under open-circuit faults, and have desirable dynamic and static performance, anti-interference ability and robustness under normal and faulty operation, thereby comprehensively improving the operating performance of the motor drive systems. The present disclosure does not need to change coordinate transformation and additional compensation voltage. That is, the present disclosure does not need to change the structure of the control systems, but only needs to change the control strategy of one of the modules to realize fault-tolerant operation under different faults. Therefore, the present disclosure simplifies the control algorithm, minimizes the reconfiguration of the control systems under different faults, and saves the controller's CPU and other memory resources. The present disclosure breaks through the technical constraints of traditional fault-tolerant control, which is generally based on direct-axis and quadrature-axis components of the fundamental current to ensure that the MMF is equal before and after the fault. The present disclosure considers the action mechanism of the direct-axis and quadrature-axis components of the third harmonic current before and after the fault to ensure that the stator flux linkage trajectory is circular, and further improves the current quality under fault-tolerant operation. The present disclosure is based on the strategy of "$i_d=0$" control and flux linkage adaptive predetermined point control to ensure that the direct-axis current component of the motors under different operating conditions including fault operating conditions is zero. The present disclosure solves the problem of large loss of the motors under sudden load or fault operating conditions, and effectively improves the efficiency of the motor drive systems.

The above embodiments are only used to illustrate the design ideas and features of the present disclosure, such that those skilled in the art can understand the content of the present disclosure and implement the present disclosure accordingly. Therefore, the protection scope of the present disclosure is not limited to the above embodiments. Any equivalent changes or modifications made to the principle and design ideas of the present disclosure should fall within the protection scope of the present disclosure.

What is claimed is:

1. A unified open-circuit fault-tolerant control method for a vector control (VC) drive system and a direct torque control (DTC) drive system of a five-phase permanent magnet fault-tolerant motor, comprising the following steps:

step 1) establishing a mathematical model of various currents of the five-phase permanent magnet fault-tolerant motor under normal operation:
wherein currents $i_A$, $i_B$, $i_C$, $i_D$, and $i_E$ of the five-phase permanent magnet fault-tolerant motor under normal operation are as follows:

$$\begin{bmatrix} i_A \\ i_B \\ i_C \\ i_D \\ i_E \end{bmatrix} = \begin{bmatrix} \sin\theta & \cos\theta & \sin 3\theta & \cos 3\theta \\ \sin(\theta-\gamma) & \cos(\theta-\gamma) & \sin 3(\theta-\gamma) & \cos 3(\theta-\gamma) \\ \sin(\theta-2\gamma) & \cos(\theta-2\gamma) & \sin 3(\theta-2\gamma) & \cos 3(\theta-2\gamma) \\ \sin(\theta-3\gamma) & \cos(\theta-3\gamma) & \sin 3(\theta-3\gamma) & \cos 3(\theta-3\gamma) \\ \sin(\theta-4\gamma) & \cos(\theta-4\gamma) & \sin 3(\theta-4\gamma) & \cos 3(\theta-4\gamma) \end{bmatrix} \begin{bmatrix} i_{d1}^* \\ i_{q1}^* \\ i_{d3}^* \\ i_{q3}^* \end{bmatrix}$$

wherein, $\gamma=72°$; $\theta$ is an electrical angle of a rotor position; $i_{d1}^*$ and $i_{q1}^*$ are direct-axis and quadrature-axis components of a predetermined value of a fundamental current; and $i_{d3}^*$ and $i_{q3}^*$ are direct-axis and quadrature-axis components of a predetermined value of a third harmonic current;

step 2) obtaining fault-tolerant currents under an open circuit of a single phase, open circuits of two non-adjacent phases and open circuits of two adjacent phases, and analyzing a fault-tolerant mechanism;

step 3) constructing a torque controller based on a difference between a predetermined speed and a detected speed to obtain a predetermined torque $T_e^*$ to suppress a torque ripple of the motor after a fault, wherein a load disturbance, system parameter changes, and an electromagnetic torque ripple caused by the fault are considered;

step 4) detecting the five-phase currents $i_A$, $i_B$, $i_C$, $i_D$, and $i_E$ of the five-phase permanent magnet fault-tolerant motor, and obtaining current components $i_{d1}$, $i_{q1}$, $i_{d3}$, and $i_{q3}$ in a two-phase rotating coordinate system through Clark and Park transforms;

wherein, the current components of the five-phase permanent magnet fault-tolerant motor in the two-phase rotating coordinate system are expressed as follows:

$$\begin{bmatrix} i_{d1} \\ i_{q1} \\ i_{d3} \\ i_{q3} \end{bmatrix} = \begin{bmatrix} \cos\theta & \cos(\theta-\gamma) & \cos(\theta-2\gamma) & \cos(\theta-3\gamma) & \cos(\theta-4\gamma) \\ -\sin\theta & -\sin(\theta-\gamma) & -\sin(\theta-2\gamma) & -\sin(\theta-3\gamma) & -\sin(\theta-4\gamma) \\ \cos 3\theta & \cos 3(\theta-\gamma) & \cos 3(\theta-2\gamma) & \cos 3(\theta-3\gamma) & \cos 3(\theta-4\gamma) \\ -\sin 3\theta & -\sin 3(\theta-\gamma) & -\sin 3(\theta-2\gamma) & -\sin 3(\theta-3\gamma) & -\sin 3(\theta-4\gamma) \end{bmatrix} \begin{bmatrix} i_A \\ i_B \\ i_C \\ i_D \\ i_E \end{bmatrix}$$

step 5) calculating direct-axis and quadrature-axis fundamental voltages of the VC drive system and the DTC drive system based on the current components $i_{d1}$ and $i_{q1}$ in the two-phase rotating coordinate system and the predetermined torque $T_e^*$;

step 6) obtaining direct-axis and quadrature-axis third harmonic voltages through the current components $i_{d3}$ and $i_{q3}$ in the two-phase rotating coordinate system, based on a control strategy of zero third harmonic current;

step 7) calculating winding phase voltages in a fault mode based on the fault-tolerant mechanism and the direct-axis and quadrature-axis voltages;

step 8) obtaining predetermined phase voltages in a fault-tolerant operation mode based on a back-electromotive force (EMF) and the winding phase voltages in the fault mode; and step 9) processing the predetermined phase voltages by a voltage source inverter, and achieving undisturbed operation of the VC drive system and the DTC drive system of the five-phase permanent magnet fault-tolerant motor under open-circuit fault through chaotic pulse width modulation (CPWM).

2. The unified open-circuit fault-tolerant control method according to claim 1, wherein step 2) is implemented as follows, wherein a magnetomotive force (MMF) of the five-phase permanent magnet fault-tolerant motor under normal operation is expressed as follows:

$$MMF_1 = Ni_A + \eta Ni_B + \eta^2 Ni_C + \eta^3 Ni_D + \eta^4 Ni_E$$

wherein, $\eta = \cos\gamma + j\sin\gamma$; N is a number of winding turns; $i_A$, $i_B$, $i_C$, $i_D$, and $i_E$ are currents of phases A, B, C, D, and E of the motor under normal operation;

when the phase A is open-circuited, the current of the faulty phase A is zero, so the MMF of the five-phase permanent magnet fault-tolerant motor is expressed as follows:

$$MMF_2 = \eta Ni_{B1} + \eta^2 Ni_{C1} + \eta^3 Ni_{D1} + \eta^4 Ni_{E1}$$

wherein, $i_{B1}$, $i_{C1}$, $i_{D1}$, and $i_{E1}$ are currents of the phases B, C, D, and E when the phase A is faulty;

based on a principle of equal MMF before and after the fault and equal fault-tolerant current amplitude and in consideration of the third harmonic current, current distribution of non-faulty phases except for the phase A is derived:

$$\begin{bmatrix} i_{B1} \\ i_{C1} \\ i_{D1} \\ i_{E1} \end{bmatrix} = T_p \begin{bmatrix} i_{d1}^* \\ i_{q1}^* \\ i_{d3}^* \\ i_{q3}^* \end{bmatrix}$$

-continued wherein, $$T_p = 1.382 \begin{bmatrix} \sin\left(\theta-\frac{\gamma}{2}\right) & \cos\left(\theta-\frac{\gamma}{2}\right) & \sin(3\theta+\gamma) & \cos(3\theta+\gamma) \\ \sin(\theta-2\gamma) & \cos(\theta-2\gamma) & \sin(3\theta+4\gamma) & \cos(3\theta+4\gamma) \\ \sin(\theta+2\gamma) & \cos(\theta+2\gamma) & \sin(3\theta-4\gamma) & \cos(3\theta-4\gamma) \\ \sin\left(\theta+\frac{\gamma}{2}\right) & \cos\left(\theta+\frac{\gamma}{2}\right) & \sin(3\theta-\gamma) & \cos(3\theta-\gamma) \end{bmatrix};$$

based on the principle of equal MMF before and after the fault, fault-tolerant currents in case of open-circuit faults of two adjacent phases and two non-adjacent phases are calculated, respectively, wherein the five-phase permanent magnet fault-tolerant motor has no third harmonic current in case two phases are open-circuited, so the third harmonic current is ignored; and in case two non-adjacent phases (A, C) are open-circuited, the fault-tolerant currents are as follows:

$$\begin{cases} i_{B2} = 1.382 i_{d1}^* \cos(\theta - \gamma) + 1.382 i_{q1}^* \sin(\theta - \gamma) \\ i_{D2} = -2.236 i_{d1}^* \cos\theta - 2.236 i_{q1}^* \sin\theta \\ i_{E2} = 2.236 i_{d1}^* \cos(\theta + 0.5\gamma) + 2.236 i_{q1}^* \sin(\theta + 0.5\gamma) \end{cases}$$

wherein, $i_{B2}$, $i_{D2}$, and $i_{E2}$ are currents of the phases B, D, and E when the phases A and C are open-circuited; and in case two adjacent phases (A, B) are open-circuited, the fault-tolerant currents are as follows:

$$\begin{cases} i_{C3} = 2.236 i_{q1}^* \cos(\theta - \gamma) + 2.236 i_{d1}^* \sin(\theta - \gamma) \\ i_{D3} = 3.618 i_{q1}^* \cos(\theta + 2\gamma) + 3.618 i_{d1}^* \sin(\theta + 2\gamma) \\ i_{E3} = 2.236 i_{q1}^* \cos\theta + 2.236 i_{d1}^* \sin\theta \end{cases}$$

wherein, $i_{C3}$, $i_{D3}$, and $i_{E3}$ are currents of the phases C, D, and E when the phases A and B are open-circuited;

when the five-phase permanent magnet fault-tolerant motor has the fault, adopting a corresponding fault-tolerant control strategy to ensure that the phase currents meet the requirements of the fault-tolerant currents, and to ensure the undisturbed operation of the motor under different faults.

3. The unified open-circuit fault-tolerant control method according to claim 1, wherein in step 3), constructing the torque controller based on the difference between the predetermined speed and the detected speed to obtain the predetermined torque $T_e^*$ is implemented as follows, wherein a torque-speed relationship of the five-phase permanent magnet fault-tolerant motor is defined as follows:

$$\frac{d\omega}{dt} = -\frac{B}{J}\omega - \frac{T_L}{J} + \frac{T_e}{J}$$

wherein, $\omega$ is a mechanical angular velocity, B is a friction coefficient, J is a moment of inertia, and $T_L$ is a load torque;

an electromagnetic torque of the five-phase permanent magnet fault-tolerant motor system in a fault mode is expressed as follows:

$$T_e = T_b + \Delta T_e$$

wherein, $T_b$ denotes an electromagnetic torque without a ripple component, $\Delta T_e$ denotes an electromagnetic torque with a ripple component caused by the fault; $T_b$ is designed to ensure a performance of the five-phase motor system, and $\Delta T_e$ is considered as an uncertain factor of the system; and a torque control strategy is used to eliminate the disturbing $\Delta T_e$ to suppress the torque ripple of the five-phase permanent magnet fault-tolerant motor after the fault;

wherein $\Delta T_e = \alpha_1 T_b$, $\alpha_1$ is unknown but bounded with a maximum value of $\alpha_{1m}$, and $\alpha_1$ satisfies $|\alpha_1| \leq \alpha_{1m} < 1$, the torque-speed relationship of the five-phase permanent magnet fault-tolerant motor is rewritten as:

$$\frac{d\omega}{dt} = -\frac{B_m}{J_m}\omega + \left(\frac{B_m}{J_m} - \frac{B}{J}\right)\omega - \frac{T_L}{J} + \frac{1}{J_m}(1-\alpha_2)(1+\alpha_1)T_b$$

wherein, $B_m$ and $J_m$ are respectively a maximum value of B and a minimum value of J, both of which are greater than zero, and are obtained based on an extreme environment of the motor system; $\alpha_2 = 1 - (J_m/J)$, wherein $\alpha_2$ falls within a range of $0 \leq \alpha_2 < 1$; and $e = \omega - \omega^*$, with $\omega^*$ being a predetermined angular velocity of a rotor, wherein:

$$\omega = e + \omega^*$$

a relationship is derived as follows:

$$\frac{de}{dt} = -\frac{B_m}{J_m}e + \left(\frac{B_m}{J_m} - \frac{B}{J}\right)e - \frac{B}{J}\omega^* - \frac{T_L}{J} + \frac{1}{J_m}(1-\alpha_2)(1+\alpha_1)T_b$$

based on a strong robust control law, a torque controller is designed as follows:

$$T_b = -\frac{\lambda \tau}{|\lambda| + \varepsilon}$$

wherein, $$\lambda = -\frac{B_m|e| + B_m|\omega^*| + T_m}{(1-\alpha_{1m})(1-\alpha_{2m})};$$

$$\tau = \frac{e}{J_m}\lambda;$$

$T_m$ is a maximum value of $T_L$, which is greater than zero; $|e|$ is an absolute value of a difference between the mechanical angular velocity and the predetermined angular velocity of the rotor; $|\lambda|$ is an absolute value of $\lambda$; and $\varepsilon$ is a constant greater than zero.

4. The unified open-circuit fault-tolerant control method according to claim 1, wherein in step 5), calculating the direct-axis and quadrature-axis fundamental voltages of the VC drive system and the DTC drive system based on the current components $i_{d1}$ and $i_{q1}$ in the two-phase rotating coordinate system and the predetermined torque $T_e^*$ comprises:

part 1: obtaining a predetermined quadrature-axis fundamental voltage of the VC drive system;

(1.1) using $i_d = 0$ control, and inputting a difference between a predetermined direct-axis current zero and a direct-axis current $i_{d1}$ into a proportional integral (PI) controller to obtain a predetermined direct-axis voltage $u_{d1}^*$;

(1.2) obtaining a quadrature-axis current $i_{q1}^*$, and inputting a difference between $i_{q1}^*$ and a quadrature-axis current $i_{q1}$ into the PI controller to obtain a predetermined quadrature-axis voltage $u_{q1}^*$, wherein the quadrature-axis current $i_{q1}^*$ is calculated as follows:

$$i_{q1}^* = \frac{2T_e^*}{5p_r\psi_f}$$

wherein, $p_r$ is a number of pole pairs of the motor, and $\psi_f$ is an amplitude of a permanent magnet flux linkage;

part 2: obtaining a predetermined quadrature-axis fundamental voltage of the DTC drive system;

(2.1) calculating an amplitude, a phase and an estimated torque of a stator flux linkage through the current components $i_{d1}$ and $i_{q1}$ in the two-phase rotating coordinate system, wherein, direct-axis and quadrature-axis components of the stator flux linkage are as follows:

$$\begin{cases} \psi_d = L_s i_{d1} + \psi_f \\ \psi_q = L_s i_{q1} \end{cases} \qquad 5$$

wherein, $L_s$ is a stator inductance;
obtaining the amplitude and phase of the stator flux linkage from the above equation:

$$\begin{cases} \psi_s = \sqrt{\psi_d^2 + \psi_q^2} \\ \delta = \arctan(\psi_d/\psi_q) \end{cases},$$

and
calculating, based on direct-axis and quadrature-axis inductances of the five-phase permanent magnet fault-tolerant motor that are sub-equal, the estimated torque as follows:

$$T_e = \frac{5}{2} p_r \psi_f i_{q1}$$

(2.2) inputting a difference between the predetermined torque $T_e^*$ and the calculated torque into a speed PI controller to obtain a torque angle increment $\Delta\delta$, and obtaining a predetermined value $\psi_s^*$ of the stator flux linkage through a flux linkage adaptive predetermined point control strategy;
rewriting the torque equation by considering that the electromagnetic torque of the five-phase permanent magnet motor is essentially an interaction result of magnetic fields of a rotor and a stator:

$$T_e = \frac{5}{2} p_r \frac{1}{L_s} \vec{\psi}_f \times \vec{\psi}_s = \frac{5}{2} p_r \frac{1}{L_s} \psi_f \times \psi_s \sin\delta$$

wherein, $\vec{\psi}_f$ is a magnetic field vector of the rotor; $\vec{\psi}_s$ is a magnetic field vector of the stator; and $\delta$ is an angle between the stator flux linkage and the rotor flux linkage being a phase angle of the stator flux linkage;
taking the derivative of both sides of the above equation to obtain:

$$\Delta T_e = \frac{3}{2} p_r \frac{1}{L_s} \psi_f \psi_s \Delta\delta \cos\delta$$

wherein, a torque deviation $\Delta T_e$ and the torque angle increment $\Delta\delta$ have a nonlinear relationship; and the torque angle increment $\Delta\delta$ is obtained by inputting $\Delta T_e$ into the PI controller;
if the predetermined stator flux linkage is a fixed value, when the motor is operating with no load or sudden load, an additional direct-axis current component is needed to maintain the stator flux linkage unchanged; by inputting the difference between the direct-axis current $i_{d1}$ and zero into the PI controller to obtain the predetermined stator flux linkage, the predetermined stator flux linkage is adaptively adjustable based on the load to ensure that the direct-axis current component is zero when the motor is operating under different conditions;

(2.3) calculating the amplitude, the phase, the torque angle increment $\Delta\delta$ and the predetermined value $\psi_s^*$ of the stator flux linkage by an expected voltage, and obtaining reference values of the direct-axis and quadrature-axis fundamental voltages $u_{d1}^*$ and $u_{q1}^*$ in the two-phase rotating coordinate system:
expressing the reference values of the direct-axis and quadrature-axis fundamental voltages based on the equations of the direct-axis and quadrature-axis voltages of the five-phase permanent magnet fault-tolerant motor, wherein $R_s$ is a stator resistance:

$$\begin{cases} u_{d1}^* = R_s i_{d1} + \dfrac{\psi_s^* \cos(\delta + \Delta\delta) - \psi_s \cos\delta}{\Delta T} \\ u_{q1}^* = R_s i_{q1} + \dfrac{\psi_s^* \sin(\delta + \Delta\delta) - \psi_s \sin\delta}{\Delta T} \end{cases}.$$

5. The unified open-circuit fault-tolerant control method according to claim 1, wherein step 6) comprises, inputting differences between the current components $i_{d3}$ and $i_{q3}$ in the tow-phase rotating coordinate system and zero respectively into the PI controller to obtain corresponding direct-axis and quadrature-axis third harmonic voltages.

6. The unified open-circuit fault-tolerant control method according to claim 1, wherein step 7) is implemented as follows, wherein
the phase voltages of the five-phase permanent magnet fault-tolerant motor are expressed as follows:

$$u_x = R_s i_x + L_s \frac{d}{dt} i_x + e_x$$

wherein, x=A, B, C, D, E; $R_s$ is a stator resistance, $i_x$ is a phase current; and $e_x$ is a back-EMF;
the expression of the phase voltages is rewritten as follows:

$$u_{xe} = u_x - e_x = R_s i_x + L_s \frac{d}{dt} i_x$$

wherein, when the five-phase fault-tolerant motor has the fault, the expression is expressed by direct-axis and quadrature-axis voltages; expression of the phase voltages under different faults is obtained; and when a winding of the phase A is faulty, the phase voltages are expressed as follows:

$$\begin{bmatrix} u_{Be1} \\ u_{Ce1} \\ u_{De1} \\ u_{Ee1} \end{bmatrix} = T_p \begin{bmatrix} u_{ed1}^* \\ u_{eq1}^* \\ u_{ed3}^* \\ u_{eq3}^* \end{bmatrix}$$

in addition, $u_{A1}=0$; $U_{Ae1}$, $U_{Be1}$, $U_{Ce1}$, $U_{De1}$ and $U_{Ee1}$ are phase voltages when the phase A is faulty, which do not consider the back-EMF; $u_{ed1}^*=u_{d1}^*-e_{d1}^*$, $u_{eq1}^*=u_{q1}^*-e_{q1}^*$, $u_{ed3}^*=u_{d3}^*-e_{d3}^*$, $u_{eq3}^*=u_{q3}^*-e_{q3}^*$; and $e_{d1}^*$, $e_{q1}^*$, $e_{d3}^*$ and $e_{q3}^*$ are back-EMF-based direct-axis and quadrature-axis components of the phase voltages, which are obtained through the back-EMF by a coordinate transformation matrix of a five-phase stationary coordinate system to the two-phase rotating coordinate system;

when windings of the phases A and C are faulty, the phase voltages are expressed as follows:

$$\begin{cases} u_{Ae2} = 0 \\ u_{Be2} = 1.382 u_{eq1}^* \cos(\theta - \gamma) + 1.382 u_{ed1}^* \sin(\theta - \gamma) \\ u_{Ce2} = 0 \\ u_{De2} = -2.236 u_{eq1}^* \cos\theta - 2.236 u_{ed1}^* \sin\theta \\ u_{Ee2} = 2.236 u_{eq1}^* \cos(\theta + 0.5\gamma) + 2.236 u_{ed1}^* \sin(\theta + 0.5\gamma) \end{cases}$$

wherein, $u_{Ae2}$, $U_{Be2}$, $U_{Ce2}$, $U_{De2}$ and $u_{Ee2}$ are phase voltages when the windings of the phases A and C are faulty, which do not consider the back-EMF;

when windings of the phases A and B are faulty, the phase voltages are expressed as follows:

$$\begin{cases} u_{Ae3} = 0 \\ u_{Be3} = 0 \\ u_{Ce3} = 2.236 u_{eq1}^* \cos(\theta - \gamma) + 2.236 u_{ed1}^* \sin(\theta - \gamma) \\ u_{De3} = 3.618 u_{eq1}^* \cos(\theta + 2\gamma) + 3.618 u_{ed1}^* \sin(\theta + 2\gamma) \\ u_{Ee3} = 2.236 u_{eq1}^* \cos\theta + 2.236 u_{ed1}^* \sin\theta \end{cases}$$

wherein, $u_{Ae3}$, $u_{Be3}$, $U_{Ce3}$, $U_{De3}$ and $u_{Ee3}$ are phase voltages when the windings of the phases A and B are faulty, which do not consider the back-EMF.

7. The unified open-circuit fault-tolerant control method according to claim 6, wherein step 8) is implemented as follows, wherein the back-EMF of the five-phase permanent magnet fault-tolerant motor remains unchanged under an open-circuit fault and under normal operation; because the amplitude of the permanent magnet flux linkage of the five-phase permanent magnet fault-tolerant motor changes little and the back-EMF has a small harmonic content, the back-EMF of the five phases is expressed as follows:

$$\begin{bmatrix} e_A \\ e_B \\ e_C \\ e_D \\ e_E \end{bmatrix} = -\omega \psi_f \begin{bmatrix} \sin\theta \\ \sin(\theta - \gamma) \\ \sin(\theta - 2\gamma) \\ \sin(\theta - 3\gamma) \\ \sin(\theta - 4\gamma) \end{bmatrix}$$

wherein, $\psi_f$ is the amplitude of the permanent magnet flux linkage, and $\omega$ is the electrical angular velocity;

substituting the back-EMF into the phase voltage expression of the five-phase permanent magnet fault-tolerant motor leads to corresponding predetermined values of the fault-tolerant voltages under different fault modes; and when a winding of the phase A is faulty, the predetermined fault-tolerant phase voltages are expressed as follows:

$$\begin{bmatrix} u_B^* \\ u_C^* \\ u_D^* \\ u_E^* \end{bmatrix} = T_p \begin{bmatrix} u_{ed1}^* \\ u_{eq1}^* \\ u_{ed3}^* \\ u_{eq3}^* \end{bmatrix} + \begin{bmatrix} e_B \\ e_C \\ e_D \\ e_E \end{bmatrix}$$

$u_A^* = e_A$;

when windings of the phases A and C are faulty, the predetermined fault-tolerant phase voltages are expressed as follows:

$$\begin{cases} u_A^* = e_A \\ u_B^* = 1.382 u_{eq1}^* \cos(\theta - \gamma) + 1.382 u_{ed1}^* \sin(\theta - \gamma) + e_B \\ u_C^* = e_C \\ u_D^* = -2.236 u_{eq1}^* \cos\theta - 2.236 u_{ed1}^* \sin\theta + e_D \\ u_E^* = 2.236 u_{eq1}^* \cos(\theta + 0.5\gamma) + 2.236 u_{ed1}^* \sin(\theta + 0.5\gamma) + e_E \end{cases}$$

when windings of the phases A and B are faulty, the predetermined fault-tolerant phase voltages are expressed as follows:

$$\begin{cases} u_A^* = e_A \\ u_B^* = e_B \\ u_C^* = 2.236 u_{eq1}^* \cos(\theta - \gamma) + 2.236 u_{ed1}^* \sin(\theta - \gamma) + e_C \\ u_D^* = 3.618 u_{eq1}^* \cos(\theta + 2\gamma) + 3.618 u_{ed1}^* \sin(\theta + 2\gamma) + e_D \\ u_E^* = 2.236 u_{eq1}^* \cos\theta + 2.236 u_{ed1}^* \sin\theta + e_E \end{cases}$$

when the direct-axis and quadrature-axis voltages $u_d^*$ and $u_q^*$ of the five-phase permanent magnet fault-tolerant motor drive system are known, based on the expression of the predetermined fault-tolerant phase voltages, the fault-tolerant operation of the system is achieved in case of an open-circuit fault of a motor winding.

8. The unified open-circuit fault-tolerant control method according to claim 1, wherein the unified open-circuit fault-tolerant control strategy is for open-circuit fault-tolerant operation of other drive control system based on CPWM.

9. The unified open-circuit fault-tolerant control method according to claim 1, wherein the unified open-circuit fault-tolerant control method is for a control system of a five-phase permanent magnet linear motor.

* * * * *